US010614208B1

(12) United States Patent
Edwards et al.

(10) Patent No.: US 10,614,208 B1
(45) Date of Patent: Apr. 7, 2020

(54) MANAGEMENT OF LOGIN INFORMATION AFFECTED BY A DATA BREACH

(71) Applicant: Capital One Services, LLC, McLean, VA (US)

(72) Inventors: Joshua Edwards, McLean, VA (US); Michael Mossoba, McLean, VA (US); Ljubica Chatman, McLean, VA (US); Jason Ji, McLean, VA (US); Carlos Rodriguez, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/281,547

(22) Filed: Feb. 21, 2019

(51) Int. Cl.
*G06F 21/00* (2013.01)
*G06F 21/45* (2013.01)
*G06F 21/62* (2013.01)

(52) U.S. Cl.
CPC .......... *G06F 21/45* (2013.01); *G06F 21/6218* (2013.01)

(58) Field of Classification Search
CPC .............................. G06F 21/45; G06F 21/6218
See application file for complete search history.

(56) References Cited

U.S. PATENT DOCUMENTS

| | | | | |
|---|---|---|---|---|
| 9,077,747 B1 * | 7/2015 | Chen | .................. | H04L 63/1441 |
| 9,087,187 B1 * | 7/2015 | Doane | ..................... | G06F 21/41 |
| 9,300,643 B1 * | 3/2016 | Doane | ..................... | H04L 63/08 |
| 9,379,896 B1 * | 6/2016 | Altman | ................. | H04L 9/3236 |
| 9,485,271 B1 * | 11/2016 | Roundy | .............. | H04L 63/1441 |
| 9,503,451 B1 * | 11/2016 | Kane-Parry | ........... | H04L 63/083 |
| 9,641,556 B1 * | 5/2017 | Potter | ..................... | H04L 65/10 |
| 9,781,159 B1 * | 10/2017 | Hernacki | ............ | H04L 63/1483 |
| 9,824,207 B1 * | 11/2017 | Kane-Parry | ............. | G06F 21/46 |
| 9,838,384 B1 * | 12/2017 | Kane-Parry | ........... | H04L 63/083 |
| 10,277,623 B2 * | 4/2019 | Wang | .................. | H04L 63/1441 |
| 2009/0064297 A1 * | 3/2009 | Selgas | ................... | G06F 21/335 726/6 |

(Continued)

OTHER PUBLICATIONS

Golla, Maximilian et al. ""What was that site doing with my Facebook password?": Designing Password-Reuse Notifications." ACM Conference on Computer and Communications Security (2018).*

(Continued)

*Primary Examiner* — David Garcia Cervetti
(74) *Attorney, Agent, or Firm* — Harrity & Harrity, LLP

(57) ABSTRACT

A device determines that a data breach of an application has been reported and determines that an individual has an account with the application based on identifying an association between an application identifier and a username the individual uses to access the application. The device receives, from a user device associated with the individual, password information used to access the application. The device uses the password information and usernames for a group of applications with which the individual has accounts to perform a login procedure for the group of applications to determine that login information for one or more of the applications includes the password information used to access the application affected by the data breach. The device provides, to the user device or another device, a recommendation to change the password information used to access the application and the one or more applications.

20 Claims, 10 Drawing Sheets

(56) References Cited

U.S. PATENT DOCUMENTS

| | | | |
|---|---|---|---|
| 2009/0172795 A1* | 7/2009 | Ritari | H04L 63/0815 726/7 |
| 2009/0177484 A1* | 7/2009 | Davis | G06Q 30/02 705/346 |
| 2010/0043062 A1* | 2/2010 | Alexander | G06F 21/36 726/6 |
| 2012/0323717 A1* | 12/2012 | Kirsch | G06Q 20/0855 705/26.1 |
| 2013/0254857 A1* | 9/2013 | Bajenov | G06F 21/00 726/7 |
| 2013/0269010 A1* | 10/2013 | Wheeler | G06F 21/46 726/6 |
| 2017/0011214 A1* | 1/2017 | Cavanagh | G06F 21/46 |
| 2017/0155675 A1* | 6/2017 | Howe | H04L 63/0428 |
| 2017/0214712 A1* | 7/2017 | Maxwell | H04L 63/1441 |
| 2017/0272461 A1* | 9/2017 | Wang | H04L 63/1441 |
| 2017/0346797 A1* | 11/2017 | Yedidi | H04L 63/06 |
| 2018/0004935 A1 | 1/2018 | Siegrist | |
| 2018/0007079 A1* | 1/2018 | Wang | H04L 63/083 |
| 2018/0012014 A1* | 1/2018 | Sahin | G06F 21/577 |
| 2018/0027006 A1* | 1/2018 | Zimmermann | H04L 63/0227 726/11 |
| 2018/0046796 A1* | 2/2018 | Wright | H04L 9/3268 |
| 2018/0063189 A1* | 3/2018 | Versteeg | H04L 63/1466 |
| 2019/0108363 A1* | 4/2019 | Caldwell | G06F 21/6245 |

OTHER PUBLICATIONS

Wang, Chun et al. "The Next Domino to Fall: Empirical Analysis of User Passwords across Online Services." CODASPY (2018).*

\* cited by examiner

Determination Logic
- Determine which websites need to be checked
  - Machine learning
- Log into websites using username and password information
- If login succeeds, the login information may be compromised
- If login fails, further process response message to determine whether a portion of the login information may be compromised

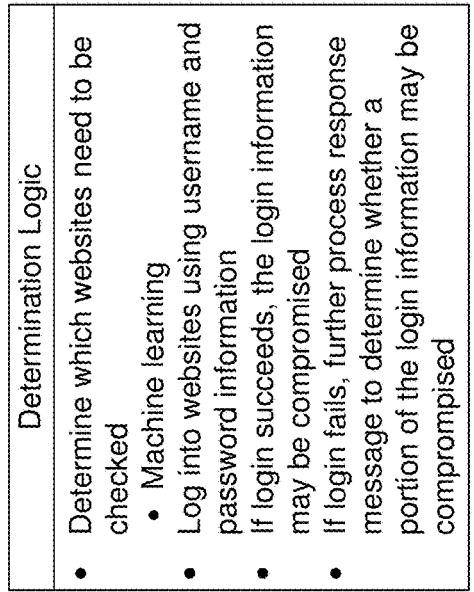

120
Determine that one or more of the group of websites share login information with the website reported to be affected by the data breach

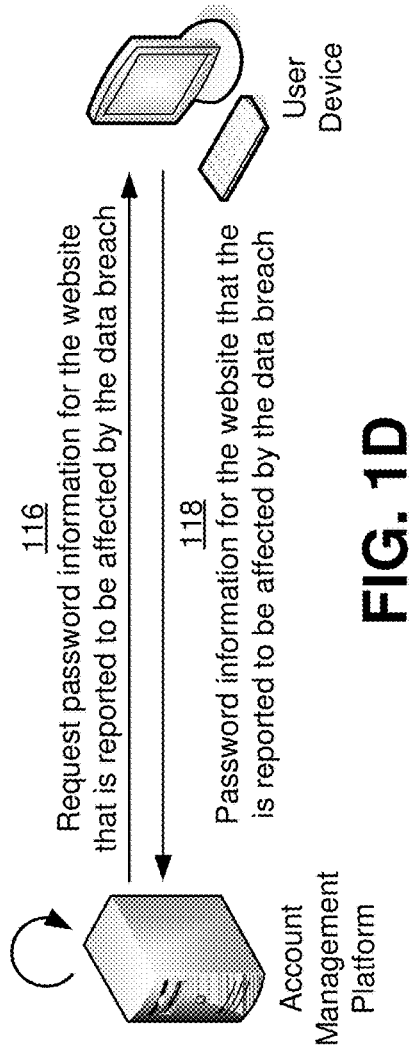

116
Request password information for the website that is reported to be affected by the data breach 118
Password information for the website that is reported to be affected by the data breach

FIG. 1D

MANAGEMENT OF LOGIN INFORMATION AFFECTED BY A DATA BREACH

BACKGROUND

A data breach is an intentional or unintentional release of secure, private, and/or confidential information to an untrusted environment or entity. In some cases, login information used to access a website may be compromised from the data breach. In these cases, an individual with an account used to access the website may have to update the login information (e.g., by resetting a password) to prevent unauthorized access to the account.

SUMMARY

According to some possible implementations, a method may include receiving, by a device, an indication to provide an individual with one or more account management services. The method may include identifying, by the device and based on receiving the indication, a group of applications with which the individual has accounts, and associating, by the device, application identifiers for the group of applications and one or more usernames used to access the group of applications. The method may include determining, by the device, that a data breach of an application has been reported, wherein the data breach is capable of causing login information of a group of individuals to be made accessible to one or more unauthorized parties. The method may include determining, by the device, that the individual has an account with the application based on identifying an association between an application identifier for the application and a username that the individual uses to access the application. The method may include providing, by the device and to a user device or user account associated with the individual, a request for password information used to access the application, and receiving, by the device and from the user device or the user account, the password information used to access the application. The method may include determining, by the device, that one or more applications of the group of applications share at least a portion of the login information used to access the application affected by the data breach. The method may include providing, by the device and to the user device or the user account, a recommendation to change at least the portion of the login information that the one or more applications share with the application affected by the data breach, wherein the recommendation is to be used by the user device or another device to implement the change.

According to some possible implementations, a device may include one or more memories, and one or more processors, communicatively coupled to the one or more memories, to determine that a data breach of an application has been reported, wherein the data breach is capable of causing login information of a group of individuals to be made accessible to one or more unauthorized parties. The one or more processors may determine, as part of an account management service for an individual, that the individual has an account with the application affected by the data breach, wherein a data structure associates application identifiers for a group of applications with which the individual has accounts, and wherein determining that the individual has the account includes referencing the data structure to determine that an application identifier for the application is associated with a username of the individual. The one or more processors may provide, to a user device associated with the individual, a request for password information used to access the application, and may receive, from the user device, the password information used to access the application. The one or more processors may identify, by referencing the data structure, one or more usernames for the group of applications with which the individual has the accounts, and may determine, by using the one or more usernames and the password information to perform a login procedure, that login information for one or more applications, of the group of applications, includes the password information used to access the application affected by the data breach. The one or more processors may provide, to the user device, a recommendation to change the password information used to access the application and the one or more applications, wherein the recommendation is to be used by the user device or another device to change the password information used to access the application and the one or more applications.

According to some possible implementations, a non-transitory computer-readable medium may store instructions that include one or more instructions that, when executed by one or more processors of a device, cause the one or more processors to receive an indication to provide an individual with one or more account management services. The one or more instructions may cause the one or more processors to obtain access to electronic mail (e-mail) content associated with an e-mail account of the individual, to analyze the e-mail content to identify a set of keywords indicative of the individual having accounts with a group of applications, wherein the set of keywords include one or more usernames used to access the group of applications, and to associate application identifiers for the group of applications and the one or more usernames used to access the group of applications. The one or more instructions may cause the one or more processors to determine that a data breach of an application has been reported, and to determine that the individual has an account with the application based on identifying an association between an application identifier for the application and a username that the individual uses to access the application. The one or more instructions may cause the one or more processors to receive, from a user device associated with the individual, password information used to access the application, and to determine, by using the one or more usernames and the password information to perform a login procedure for the group of applications, that login information for one or more applications, of the group of applications, includes the password information used to access the application affected by the data breach. The one or more instructions may cause the one or more processors to generate new password information for the application and for the one or more applications, and to provide, to the user device and via a secure communication interface, the new password information and a message indicating that the login information for the application and for the one or more applications has been updated to include the new password information.

BRIEF DESCRIPTION OF THE DRAWINGS

FIGS. 1A-1E are diagrams of an example implementation described herein.

DETAILED DESCRIPTION

Figure 1A:
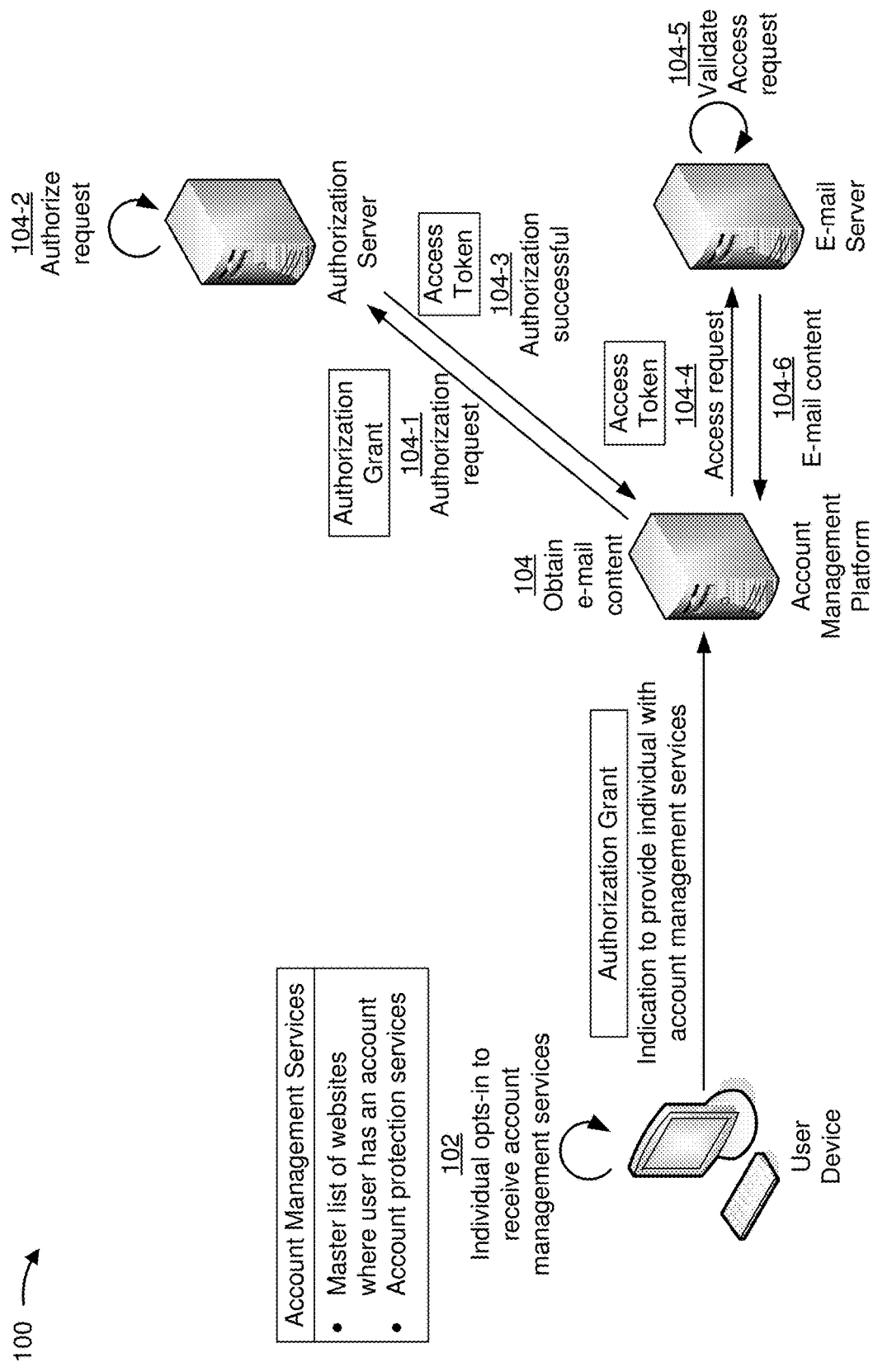

The following detailed description of example implementations refers to the accompanying drawings. The same reference numbers in different drawings may identify the same or similar elements.

An individual may access an application, such as a website, by inputting login information (e.g., a username, a password, etc.) to a login webpage of the website. If the website experiences a data breach, the login information of the individual may be released to an unauthorized party (e.g., an individual, an organization, etc.). In some cases, a reporting organization may report the data breach via a news website or other reporting outlet.

However, the individual may not read the report of the data breach and/or may not be contacted to update the login information after the data breach. Furthermore, even if the individual is aware of the data breach, and even if the individual updates the login information for the website, the login information used for other websites may also be compromised. For example, if the individual reuses the login information (or part of the login information) for other websites, an unauthorized party may be able to use the login information that has been comprised to access the other websites.

Some implementations described herein provide an account management platform to determine that login information that an individual uses to access a website has been compromised by a data breach and to assist the individual in updating the login information for that website and/or for other websites for which the individual uses the same or similar login information. For example, the account management platform may perform one or more actions to identify a group of websites with which the individual has accounts. Additionally, the account management platform may determine that a data breach has been reported for a website with which the individual has an account. In this case, the account management platform may provide, to a user device associated with the individual, a request for password information used to access the website affected by the data breach. This may cause the individual to interact with the user device to provide the account management platform with the password information.

Furthermore, the account management platform may determine that the login information that has been compromised by the data breach is also used for one or more websites that are part of a group of websites with which the individual has accounts. For example, the account management platform may perform a login procedure for each of the group of websites (e.g., using usernames for each website and the password information for the website affected by the data breach). In this case, the account management platform may determine that the login information compromised by the data breach is also used for the one or more websites based on the login procedure successfully logging in to the one or more websites. Additionally, the account management platform may provide, to the user device, a recommendation to change the password information for the one or more websites that use the login information that has been compromised by the data breach, which may cause the individual to interact with the user device to change the login information.

In this way, the account management platform secures the login information of the individual for all (or some) accounts that were determined to have been, or that were reported to have been, affected by the data breach. By securing the login information, the account management platform improves security of the group of websites with which the individual has accounts and protects information (e.g., account information, personal information, etc.) of the individual that would otherwise be accessible by an unauthorized party that has access to compromised login information. This conserves resources (e.g., processing resources, network resources, memory resources, and/or the like) that would otherwise be used to grant the unauthorized party with access to websites that use the compromised login information. Furthermore, after an account is compromised (e.g., an unauthorized user has gained access to the account), the account management platform conserves resources that would be wasted by performing account security procedures needed to lock the account and/or to unlock the account for an authorized user. For example, if an unauthorized party logged into a website using an account of an individual, and changed the password information, the individual may need to expend resources of a user device to prove that the individual is in fact an authorized user (e.g., such as by calling a customer service hotline, sending an e-mail or a short message service (SMS) message, and/or the like).

Furthermore, several different stages of the process described herein remove human subjectivity and waste from the process, and which may improve speed and efficiency of the process and conserve computing resources (e.g., processor resources, memory resources, and/or the like). For example, the account management platform may automatically identify a list of websites with which the individual has accounts (e.g., by using a data mining technique to analyze electronic mail (e-mail) content of an e-mail account of the individual). In this case, the account management platform reduces a need for the individual to remember a complete list of websites where the individual has accounts, thereby reducing scenarios where the individual might forget a website with which the individual has an account (e.g., which might be accessible using the login information that has been compromised), thereby improving quality and efficiency of the process. Additionally, implementations described herein use a rigorous, computerized process to perform tasks or roles that were not previously performed or were previously performed using subjective human intuition or input.

For the description herein, reference will be made to a data breach of a website that compromises login information for an account associated with the website. This is intended as one example of a use case of the implementations described herein. In some implementations, the data breach may relate to an account associated with an application other than, or in addition to, a web application (e.g., a website). For example, the data breach may relate to an account associated with a mobile application, a desktop application, and/or the like. Additionally, or alternatively, the login information may be configured for access to an account associated with any type of application, such as a web application (e.g., a website), a mobile application, a desktop application, and/or the like. The term application, as used herein, is to refer to a web application (e.g., a website), a mobile application, a desktop application, a hybrid application, and/or any other type of application with an interface that uses login information to access information and/or a service.

FIGS. 1A-1E are diagrams of an example implementation 100 described herein. For example, example implementation 100 may include a user device, an account management platform, an authorization server, and/or an electronic mail (e-mail) server. As shown in FIGS. 1A-1E, the account management platform may identify that an individual's login information used to access a website has been compromised by a data breach and may assist the individual in updating the login information for the website and/or for other websites with which the individual uses the same or similar login information.

As shown in FIG. 1A, by reference number 102, an individual may interact with the user device to opt-in to receive one or more account management services. For example, an account management application may include an interface that allows the individual to sign up to receive one or more account management services. The one or more account management services may include a first service to identify a list of websites with which the individual has accounts and/or one or more account protection services that protect login information of the individual in the event of a data breach. When the individual opts-in to receive the one or more account management services, an indication that the individual has opted in may be provided to the account management platform.

As an example, the individual may visit an account management website, may create an account, and may opt-in to one or more account management services after creating the account (or while creating the account). As another example, the individual may download an application to the user device, may launch the application, may create the account, and may opt-in to receive the one or more account management services. In some cases, the individual may opt-in using another communication medium, such as by responding to an offer provided via telephone, e-mail, or the like.

In some implementations, the individual may interact with the user device to identify a group of websites with which the individual has accounts (e.g., which may be used when providing the individual with the one or more account management services). For example, the individual may input, to the interface of the account management application, uniform resource locators (URLs) for a group of websites with which the individual believes the individual has accounts, one or more usernames that the individual believes are the individual's usernames for accessing the accounts, and/or the like. In some cases, the individual may consent to allow the account management platform to analyze e-mails of the individual to automatically identify the group of websites with which the individual has accounts, as described below.

As shown by reference number 104, the account management platform may obtain e-mail content that may be further processed to identify a group of websites with which the individual has accounts. For example, the individual may have consented to allow the account management platform to access e-mail content stored within an e-mail account of the individual. In this case, the account management platform may use a secure access delegation service (e.g., OAuth, etc.) to obtain a set of e-mails included in the e-mail account of the individual, which may be analyzed to identify the group of websites with which the individual has accounts, as described further herein.

An example is provided by way of reference numbers 104-1, 104-2, 104-3, 104-4, 104-5, and 104-6. As shown by reference number 104-1, the account management platform may provide an authorization request to the authorization server. For example, when the individual consents to allow the account management platform to access the e-mail account, an authorization grant may be provided to the account management platform. To access the e-mail account, the access management platform may provide the authorization grant to the authorization server. As shown by reference number 104-2, the authorization server may authorize the request.

As shown by reference number 104-3, the authorization server may provide, to the account management platform, a message indicating that the authorization was successful. The message may include an access token needed to access the e-mail content. As shown by reference number 104-4, the account management platform may provide an access request to the e-mail server. The access request may include the access token obtained from the authorization server. As shown by reference number 104-5, the e-mail server may validate the access request (e.g., by validating the access token). As shown by reference number 104-6, the e-mail server may provide the e-mail content (or access to the e-mail content) to the account management platform based on validating the token.

In this way, the account management platform receives an indication to provide the individual with the one or more account management services and obtains e-mail content that may be analyzed to identify a group of websites with which the individual has accounts.

Figure 1B:
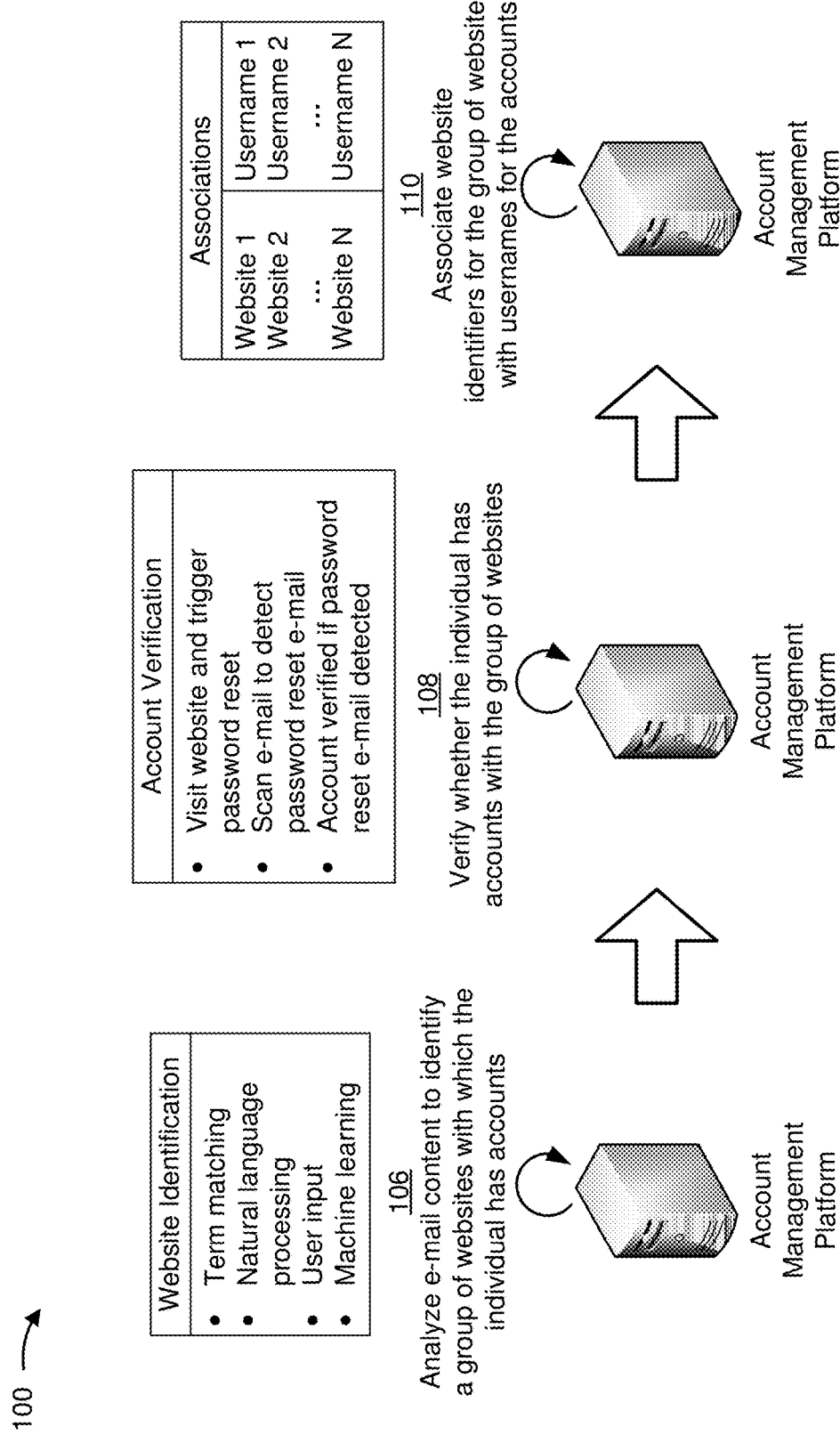

As shown in FIG. 1B, by reference number 106, the account management platform may analyze the e-mail content to identify the group of websites with which the individual has accounts. For example, the account management platform may use a term matching technique, a natural language processing technique, and/or the like, to analyze the e-mail content to identify the group of websites.

In some implementations, the account management platform may use the term matching technique to identify that the individual has an account with a website. For example, the account management platform may store or have access to a set of templates that include characters, terms, and/or phrases that identify a website (e.g., a URL of the website), that identify that the individual has, or is likely to have, an account with the website (e.g., a character, term, and/or phase that is commonly used in an account registration e-mail, an account management e-mail, an e-mail of an offer for a service that is provided only to an account holder, and/or the like), that identify a party that owns, operates, works with, and/or is associated with the website (e.g., a name of the party), and/or the like. In this case, the account management platform may compare e-mail content included in a set of e-mails and values included in the set of templates and may determine that the individual has an account with the website based on the e-mail content including values that match the values included in the set of templates, based on the e-mail content including values that satisfy a threshold level of similarity with the values included in the set of templates, and/or the like.

As an example, assume the account management platform obtains a registration e-mail. In this example, the account management platform may compare e-mail content included in the registration e-mail (e.g., a header of the e-mail, a body of the e-mail, etc.) and characters, terms and/or phrases included in the set of templates to determine that the individual has an account with a particular website. To provide a few specific examples, the e-mail content may include terms and/or phrases such as "Thank you for creating an account, your username is XXXX," "Your account has been verified and you may log in at any time," and/or the like. In this case, the set of templates may include values that match or that are similar to: "creating an account," "your username is," "your account has been verified," "you may log in," and/or the like, and the account management platform may determine that the individual has the account with the particular website based on the set of templates including the values that match or that are similar to the values found in the e-mail.

Furthermore, the account management platform may perform one or more actions to ensure that personal information of the individual is protected. For example, by automating the process for obtaining the e-mail content, the account management platform ensures that human users (other than the individual) do not interact with the e-mail content of the individual. Additionally, when analyzing the e-mail content, the account management platform may not perform any analysis of the e-mail content other than the analysis needed to identify the group of websites with which the individual has accounts, the usernames for the accounts, the password information for the accounts, and/or the like. In some cases, implementations described herein may cause new e-mails to be provided to the e-mail account of the individual (e.g., by performing a password reset procedure). In some of these cases, the account management platform may delete the e-mail after the e-mail serves its intended purpose. In this way, the account management platform is able to perform the one or more account management services while protecting personal information of the individual, reducing a likelihood of the personal information being intercepted by unauthorized parties, remaining compliant with data privacy laws of one or more jurisdictions, and/or the like.

Additionally, or alternatively, the account management platform may use a natural language processing technique to identify that the individual has an account with a website. For example, the account management platform may use a fuzzy matching technique or a similar type of technique to identify that the individual has an account with a website in scenarios where the e-mail content may only match the terms and/or phrases of a template approximately (rather than exactly). In this case, the account management platform may match e-mail content values and specific terms and/or phrases included in a template using a word distance technique (e.g., a Levenshtein distance technique, a Jaro-Winkler distance technique, etc.), an N-gram technique, and/or the like.

Additionally, or alternatively, the account management platform may identify that the individual has an account with a website by asking the individual (e.g., without obtaining and analyzing the e-mail content). For example, the account management platform may provide, for display on an interface of the user device, a request for the group of websites with which the individual has accounts. This may cause the individual to interact with the user device to provide the account management platform with information identifying the group of websites. In some cases, the individual may provide the information identifying the group of websites and the account management platform may use the secure access delegation service as a way to verify the information provided by the individual.

Additionally, or alternatively, the account management platform may use machine learning to predict that the individual has an account with a website. For example, the account management platform may be configured with a data model that has been trained on historical user data. The data model may have been trained using one or more machine learning techniques to be able to predict whether an individual who has accounts with a first website is more, or less, likely to have an account with a second website, whether an individual of a certain demographic is more, or less, likely to have an account with a particular website, and/or the like. The one or more machine learning techniques may include a regression technique, a clustering technique, a technique using a decision tree, a technique using a neural network, and/or the like. In this case, the account management platform may provide data identifying a current list of websites with which the individual has accounts as input to the data model to cause the data model to output values indicating a likelihood of the individual also having accounts with other websites.

In some cases, the data model may have been trained on historical transaction data that indicates which merchants a user has interacted with over time. This may allow the account management platform to train the data model by identifying trends that indicate types of websites, types of products, types of merchants, and/or the like, that the individual has interacted with over the particular time period. These trends may be used to predict specific websites to which the individual may have an account.

In some implementations, the account management platform may update a master list of websites with which other individuals have accounts. For example, the account management platform may store or have access to the master list of websites and may determine that a particular website, of the group of websites identified above, is not included in the master list of websites (e.g., the individual may have created an account with a new website that was not previously part of the master list). In this case, the account management platform may add the particular website to the master list of websites and may verify whether other individuals also have an account with the particular website (e.g., using one or more techniques described below).

As shown by reference number 108, the account management platform may verify whether the individual has accounts with the group of websites. For example, the account management platform may visit the group of web sites to perform a password reset procedure to verify the group of websites, and/or the like. The password reset procedure may be used to verify whether the individual has an account with a website, since a password may only be reset if the individual has the account. In this case, the account management platform may launch a web browser and may input a URL of a website into the web browser to cause the web browser to load the website.

Additionally, the account management platform may identify a login page of the website and may interact with the login webpage to request a password reset. For example, the account management platform may analyze a first webpage that is loaded after inputting the URL of the website (e.g., a homepage) to determine whether the first webpage is a login webpage. If the account management platform determines that the first webpage is not the login webpage, the account management platform may further analyze the first webpage to identify a display option (e.g., a button, a feature, etc.) that will load the login webpage, and may select the display option to load the login webpage. If the account management platform determines that the first webpage is the login webpage, the account management platform may analyze the login webpage to identify a display option associated with a request to reset a password. In this case, the account management platform may interact with the display option to reset a password used to log into the website (or to log into the account associated with the website). As an example, the account management platform may input a username, an e-mail address, and/or the like, as part of the password reset procedure, which may cause a password reset e-mail to be provided to the e-mail account of the individual.

In some cases, the account management platform may use a script to perform a password reset procedure at a website. For example, the account management platform may be configured with a script that allows the account management platform to automatically perform a password reset at a particular website. In this case, the script may be a macro that indicates which webpages, buttons, features, and/or the like, to click on to start a password reset procedure. Additionally, the script may be used to identify a permissible number of password resets before an account freezes and/or any other information that may be useful when performing a password reset.

Next, the account management platform may determine whether the password reset e-mail was provided to the e-mail account. In some cases, the account management platform may determine whether the password reset e-mail was provided to the e-mail account within a threshold time period. If the password reset e-mail is found (e.g., at all, within the threshold time period, etc.), the account management platform has successfully verified that the individual does in fact have an account with the website. This allows the account management platform to verify that the individual has accounts with the group of websites and eliminates situations where the individual mistakenly reports that the individual has an account to a website, situations where the individual previously had an account that has since been deleted, and/or the like.

In some implementations, one or more steps described above may be performed prior to performing the one or more account management services for the individual. For example, the account management platform may determine whether the first webpage of the website is the login webpage, identify a location within the login webpage of the display option to reset the password, and/or the like, prior to performing the one or more account management services for the individual. In some cases, these steps may be performed at time periods where the account management platform has a threshold amount of available capacity (e.g., during a time period where the account management platform is not servicing a large number of users). In this way, the account management platform reduces a utilization of resources needed to provide account management services (e.g., which may include verifying whether the individual has the accounts with the group of websites).

In some cases, while performing the password reset procedure, the account management platform may analyze a message displayed on the website to determine whether to analyze the e-mail account of the individual or to forgo additional processing. For example, after interacting with the display option indicating to reset the password, the webpage may display a message indicating "please check your e-mail to complete the password reset procedure." In this case, the account management platform may analyze the message to determine that the password reset e-mail was in fact provided to the individual.

In other cases, the webpage may display a message indicating "no account found, please try another username." In this case, the account management platform may analyze the message to determine that the correct username was not entered and may forgo analyzing the e-mail account of the individual. This may cause the account management platform to remove the website from a list identifying the group of websites or to ask the individual for a correct username for the website (e.g., via an interface of the account management application). In this way, the account management platform conserves resources (e.g., processing resources, network resources, etc.) relative to always analyzing the e-mail account of the individual (e.g., even if no account is found during the password reset procedure).

In some implementations, the account management platform may ask the individual for access to data that may be used to verify whether the individual has accounts with the group of websites. For example, the account management platform may provide, to the user device or an account associated with the individual, a request for e-mail content, text messages, images of physical paperwork, and/or any other data associated with the group of websites. In this case, the account management platform may analyze the data (using one or more techniques described herein) to verify that the individual has the accounts with the group of websites.

As shown by reference number 110, the account management platform may associate one or more website identifiers for the group of websites with one or more usernames for the accounts. For example, the account management platform may have identified one or more usernames for the accounts while analyzing the e-mail content as described above. Additionally, or alternatively, the account management platform may have identified the one or more usernames for the accounts when asking the individual for the group of web sites. In these cases, the account management platform may use a data structure to associate the website identifiers of the websites and the one or more usernames for the accounts.

In some implementations (not shown), the account management platform may provide a list identifying the group of websites for display on an interface of the user device. For example, as an account management service, the individual may be able to log in to the account management application and view the list identifying the group of websites with which the individual has accounts. This may assist in the individual in viewing the individual's online footprint (e.g., with respect to total number of online accounts), may remind the individual of an account that is not being used and that may be deleted, may remind the individual of an account that has a fee or bill that is due, and/or the like.

In this way, the account management platform identifies and verifies that the individual has accounts with the group of websites. Furthermore, the account management platform associates the website identifiers for the group of websites and the one or more usernames for the accounts and may reference the associations while providing the one or more account management services, as described further herein.

Figure 1C:
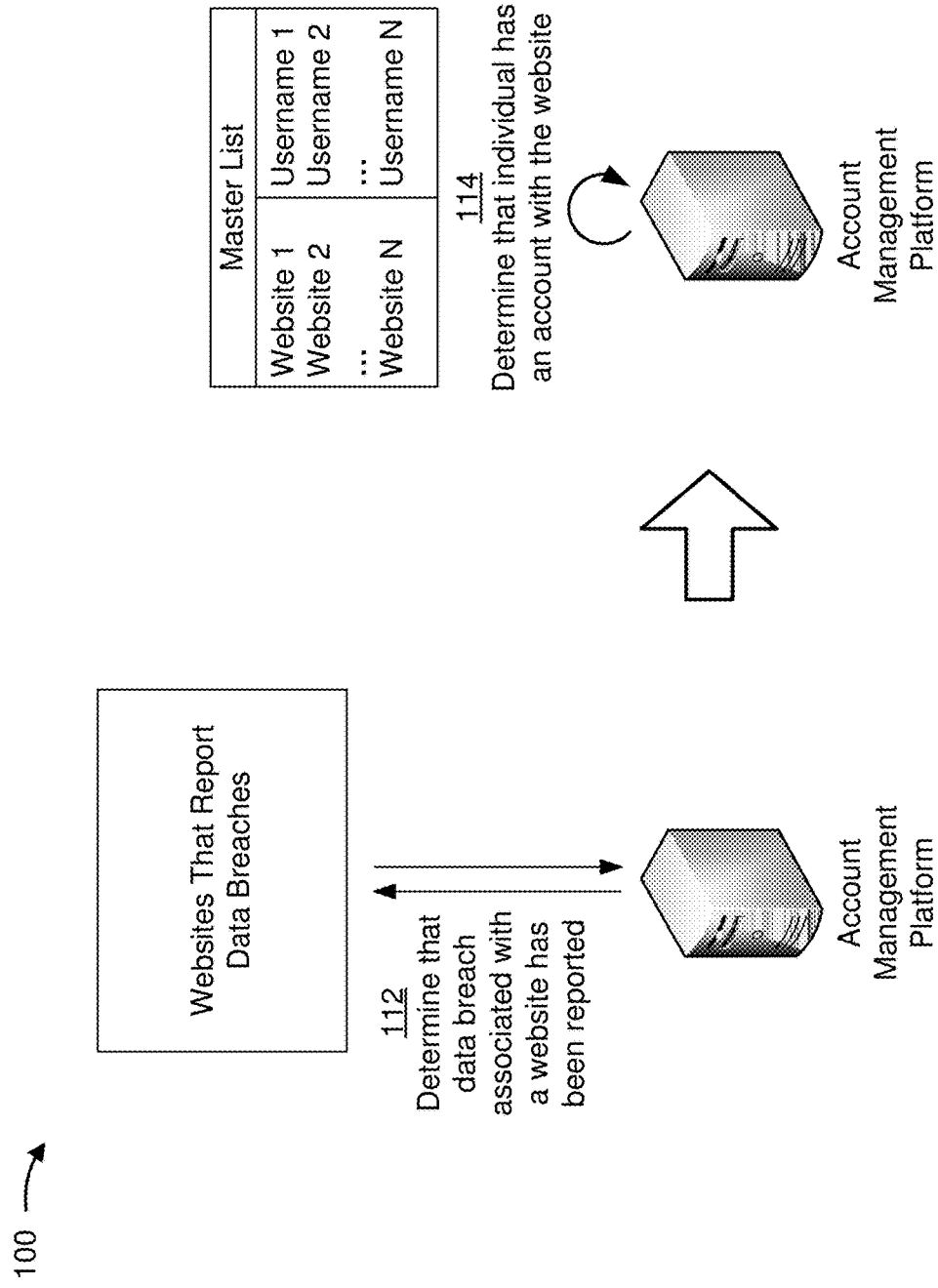

As shown in FIG. 1C, by reference number 112, the account management platform may determine that a data breach of personal information associated with a website has occurred or has been reported. For example, the account management platform may receive, from one or more websites that report data breaches, reporting data indicating that a data breach has occurred. In this case, the account management platform may analyze the reporting data (e.g., using a template matching technique, a semantic engine parser, and/or the like) to determine that information included in the reporting data specifies that a data breach has occurred. The reporting data may include a uniform resource locator (URL) of the website affected by the data breach, data identifying a list of accounts affected by the data breach, data identifying a type of information compromised by the data breach, and/or the like.

In some implementations, the account management platform may use a data mining technique to analyze a reporting website that has reported a data breach. For example, the reporting website may publish an article detailing the data breach and the account management platform may use the data mining technique to analyze the article to determine that the article specifies that the data breach has occurred. Additionally, or alternatively, the account management platform may subscribe to the reporting website. In this case, the reporting website may automatically provide the account management platform with the information detailing the data breach which may allow the account management platform to analyze the article to determine that the article specifies that the data breach has occurred.

In some implementations (not shown), the account management platform may determine that a data breach has occurred based on monitoring one or more other data sources. For example, the account management platform may monitor one or more darknet markets or crypto-markets to identify that a sale is occurring that effectively serves as evidence of a data breach. As an example, if a sale is occurring that involves personal information of a group of users, and those users not have consented to the release of the personal information, then identification of the sale of the personal information via a darknet market may allow the account management platform to identify that a data breach has occurred.

As shown by reference number 114, the account management platform may determine that the individual has an account with the website that has been reported to be affected by the data breach. For example, the account management platform may compare a website identifier for the website and the website identifiers of the group of websites with which the individual has accounts. If a match is found, the account management platform may determine that the individual has an account with the website that has been reported to be affected by the data breach. If a match is not found, the account management platform may determine that the individual does not have an account with the website that has been reported to be affected by the data breach.

Additionally, or alternatively, the account management platform may periodically analyze the e-mail account of the individual to determine whether the individual has an account with the website affected by the data breach. For example, if the data breach occurs at the website, and the individual has an account with the website, the individual may receive an e-mail notifying the individual of the data breach, requesting the individual to reset a password, and/or the like. In this case, the account management platform may use the secure access delegation technique to identify the e-mail indicating that the data breach has occurred and may analyze the e-mail to determine that the individual has an account with the website affected by the data breach.

In this way, the account management platform determines that the individual has an account with a website that is reported to have been affected by the data breach.

As shown in FIG. 1D, by reference number 116, the account management platform may provide, to the user device, a request for password information for the website that is reported to be affected by the data breach. For example, the account management platform may provide the request via an interface of the account management application or via another secure communication interface. In some cases, such as when the account management platform does not have a username for the website, the request for the password information may also include a request for the username. In other cases, a user may have already changed the password information for the website (e.g., due to hearing about the data breach). In this case, the account management platform may prompt the user device to provide a password that the user believes is compromised (instead of the current one).

As shown by reference number 118, the user device may provide, to the account management platform, the password information for the website. For example, the user device may provide the password information to the account management platform via the interface of the account management application or via the other secure communication interface. In this case, the password may be protected using one or more forms of encryption, such that a device intercepting the data would be unable to identify or interpret the password information.

As shown by reference number 120, the account management platform may determine that one or more of the group of websites share login information with the website that is reported to be affected by the data breach. For example, the account management platform may use the login information for the website (e.g., the password information obtained from the user device, the username obtained from searching the e-mail account) to perform a login procedure to determine that one or more of the group of websites share at least some of the login information (e.g., the username, the password information, etc.) with the website that has been reported as being affected by the data breach.

As an example, the account management platform may perform a login procedure for a particular website using the username and/or the password information for the website affected by the data breach. In some cases, the account management platform may be configured with a script that performs the login procedure automatically. For example, the account management platform may be configured with a macro that indicates which webpages within the website to visit to perform the login procedure, which buttons or features to select or click on, and/or the like.

In other cases, the account management platform may analyze terms, fields, text boxes, and/or the like, within the website to predict actions needed to perform the login procedure. For example, the account management platform may analyze a webpage to identify that there is a button with the text "Forgot password? Click here." In this case, despite not having a script indicating how to perform the login procedure, the account management platform may be configured with a rule that allows the account management platform to select the identified forgot password button, and to analyze the text of a subsequent interface to perform the login procedure (e.g., the interface might include commonly performed steps that the account management platform could be configured to follow, despite not having the script that indicates how to automatically perform the login procedure).

If the login succeeds, the account management platform may determine that the particular website shares the login information with the website affected by the data breach. If the login does not succeed, the account management platform may process a response message to determine whether the particular message shares a portion of the login information with the website affected by the data breach (e.g., just the username, just the password, etc.). For example, the response message might display "the password input to access this account is incorrect, please try again using the correct password." The account management platform may analyze this response message to determine that the username for the particular website is the same as the username for the website affected by the data breach, but that a different password is used.

As another example, the response message might display "account not found, please enter the correct username and password to access your account." In this case, the account management platform may analyze this response message to determine that the particular website does not share any login information with the website affected by the data breach.

In some implementations, the account management platform may forgo performance of the login procedure on a subset of the group of websites. For example, the account management platform may determine a set of properties associated with the password information used to access the application. In this case, the account management platform may analyze the password information using a template matching technique and/or a similar type of technique to determine the set of properties. The set of properties may include a first property indicating a total number of characters in a password, a second property indicating a type of character used in the password (e.g., a text character, a symbol, a numerical character, etc.), a third property indicating a combination of characters that are used in the password, a fourth property indicating a sequence of characters that are used in the password, and/or the like.

Additionally, the account management platform may determine that a subset of the group of websites have password restrictions that require properties that are not found in the password information used to access the website affected by the data breach. For example, the account management platform may identify password restrictions for the group of websites by analyzing historical account data of other individuals, by creating dummy accounts for the group of websites and testing password restrictions, and/or the like. In this case, the account management platform may compare the set of properties and the password restrictions to determine that the subset of the group of websites have password requirements that require properties that are not found in the password information used to access the application. Furthermore, the account management platform may forgo performance of the login procedure on the subset of the websites and may perform the login procedure on a remainder of the group of websites. In this way, the account management platform conserves resources (e.g., processing resources, network resources, etc.) that would otherwise be used to perform the login procedure on all of the websites that are part of the group of websites.

One or more implementations described herein may involve logging into an account, which may lead to inputting an incorrect username and/or password. In these implementations, the account management platform may be configured with data identifying a number of incorrect login attempts that are permitted by a website before an account is locked. For example, the account management platform may be configured with data identifying the number of incorrect login attempts that are permitted based on historical user data, based on creating dummy accounts and testing the number of incorrect logins that are permitted, and/or the like. In this case, the account management platform may, prior to attempting to log into an account, verify that attempting to log into the account will not lock the account. In this way, the account management platform ensures that the accounts of the individual are not locked due to improper login attempts, thereby improving satisfaction and customer service for the individual while conserving resources (e.g., processing resources, network resources, and/or the like) that would otherwise be used to lock and unlock the account.

In some implementations, the account management platform may use machine learning to forgo performance of the login procedure on a subset of the group of websites. For example, the account management platform may use a data model that has been trained on historical information to determine when to forgo performance of the login procedure on the subset of the group of websites. The historical information may include historical password information for passwords of other individuals that have used the one or more account management services, historical password restrictions for particular websites, and/or the like. The data model may be used to predict whether a particular website has particular password restrictions in situations where the account management platform does not know the exact password restrictions of the website.

In this case, the account management platform may provide a website identifier for a particular website as input to the data model to cause the data model to output values that may be used to identify whether the website has password restrictions, which password restrictions apply to the website, and/or the like. In this way, the account management platform may forgo performance of the login procedure on the particular website, even if the account management platform does not know the exact password requirements of the website. This allows the account management platform to conserve resources (e.g., processing resources, memory resources, and/or the like) relative to performing the login procedure on all (or some) of the group of websites.

In some implementations, the account management platform may not have the password information needed to perform the login procedure. For example, the individual may choose not to provide the account management platform with the password information. In this case, the account management platform may perform one or more actions to assist the individual in manually determining whether the login information that has been compromised by the data breach is also used for other websites. For example, the account management platform may instruct the user device to open different web browsers for each of the group of websites and to populate username fields for the group of websites with usernames for each respective account. This may allow the individual to visit each web browser and manually input the password information. Furthermore, an application (e.g., a daemon, a browser plugin, and/or the like) running on the user device may be configured to detect what happens after the user inputs the password information and may report the outcome to the account management platform. This allows the account management platform to provide the one or more account management services while maintaining the privacy of the individual's passwords.

In this way, the account management platform determines that one or more websites share login information with the website that is reported to be affected by the data breach.

Figure 1E:
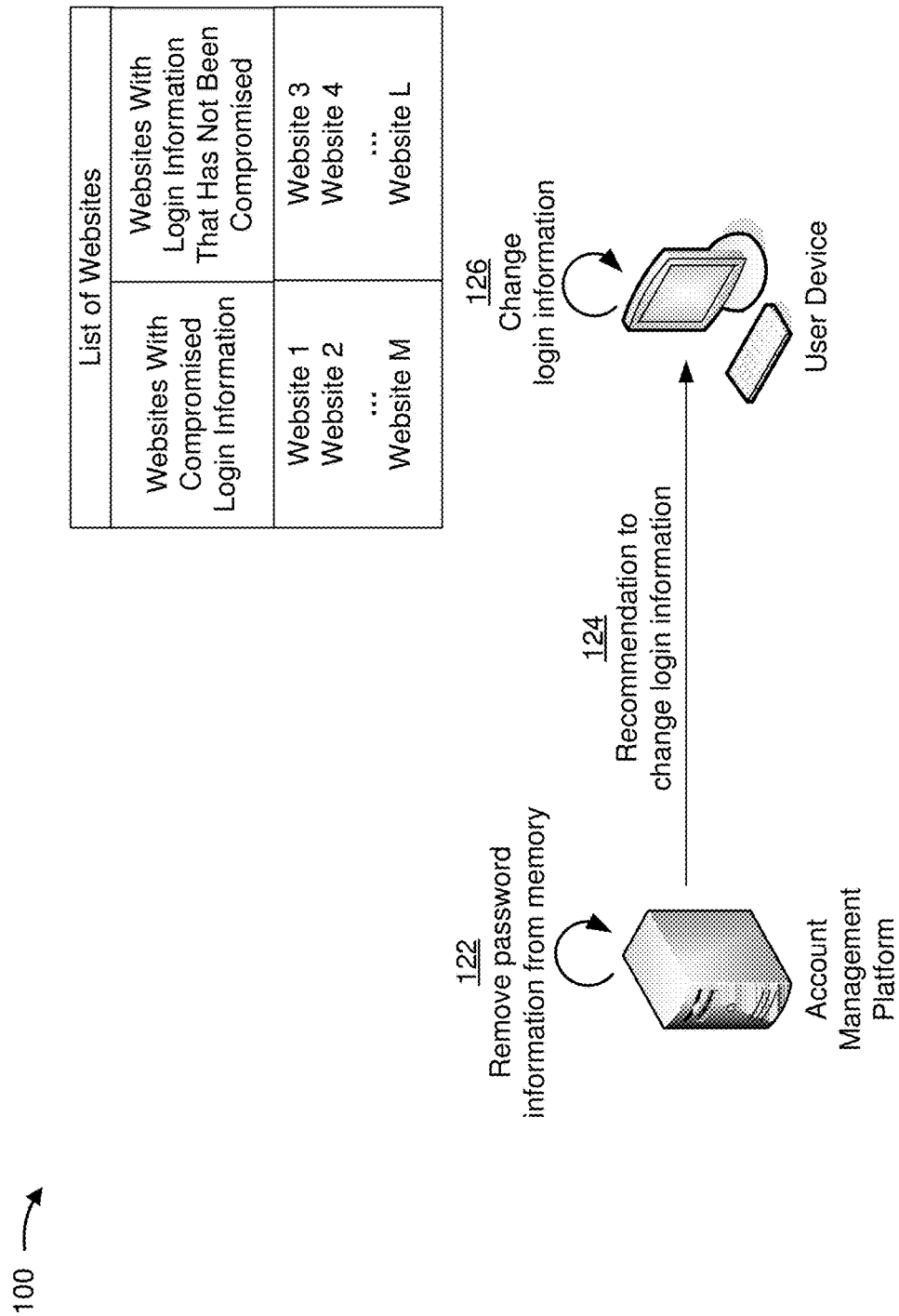

As shown in FIG. 1E, by reference number 122, the account management platform may remove the password information from memory. For example, the account management platform may remove (e.g., delete) the password information from memory to reduce a likelihood of the password information being intercepted by unauthorized users.

As shown by reference number 124, the account management platform may provide, to the user device, a recommendation to change the login information of the website affected by the data breach and/or the one or more websites that share at least a portion of the login information used to log into the website affected by the data breach. For example, the account management platform may provide the recommendation for display on the interface of the user device. In some cases, as shown, the account management platform may provide a list of websites that identifies which websites have had login information compromised and which websites have not had login information compromised.

As shown by reference number 126, the individual may interact with the user device to change the login information based on the recommendation. For example, the individual may manually perform a login information reset procedure to change the username and/or the password information for accounts affected by the data breach.

In some implementations, the account management platform may automatically change the password for the individual. For example, the account management platform may, for each website with login information compromised by the data breach, generate new password information and may perform a password reset procedure to include the new password information as part of the login information. Additionally, or alternatively, the account management platform may automatically change the username for the individual (e.g., by generating a new username and by performing a username reset procedure). In this case, the account management platform may provide, via a secure communication interface, an indication that the password information and/or the username has been changed. The secure communication interface may secure the transmission of data by using one or more forms of encryption, by sending the new password information and the new username in separate secure transmissions, by sending the new password information and/or the new username piecemeal via multiple transmissions, and/or the like.

In some implementations, the account management platform may identify password restrictions for a website (e.g., using one or more techniques described above) and may generate the new password information in a manner that is compliant with the password restrictions of the website. For example, when generating the new password information, the account management platform may generate a random string of characters that is of a particular length, may generate a string of characters that includes or is limited to characters identified in a password restriction, may generate a particular sequence of characters, and/or the like.

In this way, the account management platform secures the login information of the individual for accounts that were, or that were reported to have been, affected by the data breach. By securing the login information, the account management platform protects information (e.g., account information, personal information, etc.) of the individual that would otherwise be accessible by an unauthorized party that has access to compromised login information. This reduces unauthorized access to accounts of the individual, thereby conserving resources (e.g., processing resources, network resources, memory resources, and/or the like) that would otherwise be used to grant an unauthorized party with access to websites that use the compromised login information, conserves resources that would be wasted by performing account security procedures needed to lock an account after unauthorized access was successful and/or to unlock the account for an authorized user, and/or the like.

As indicated above, FIGS. 1A-1E are provided merely as an example. Other examples may differ from what was described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple and/or distributed devices. Additionally, or alternatively, a set of devices (e.g., one or more devices) of example implementation 100 may perform one or more functions described as being performed by another set of devices of example implementation 100.

Figure 2:
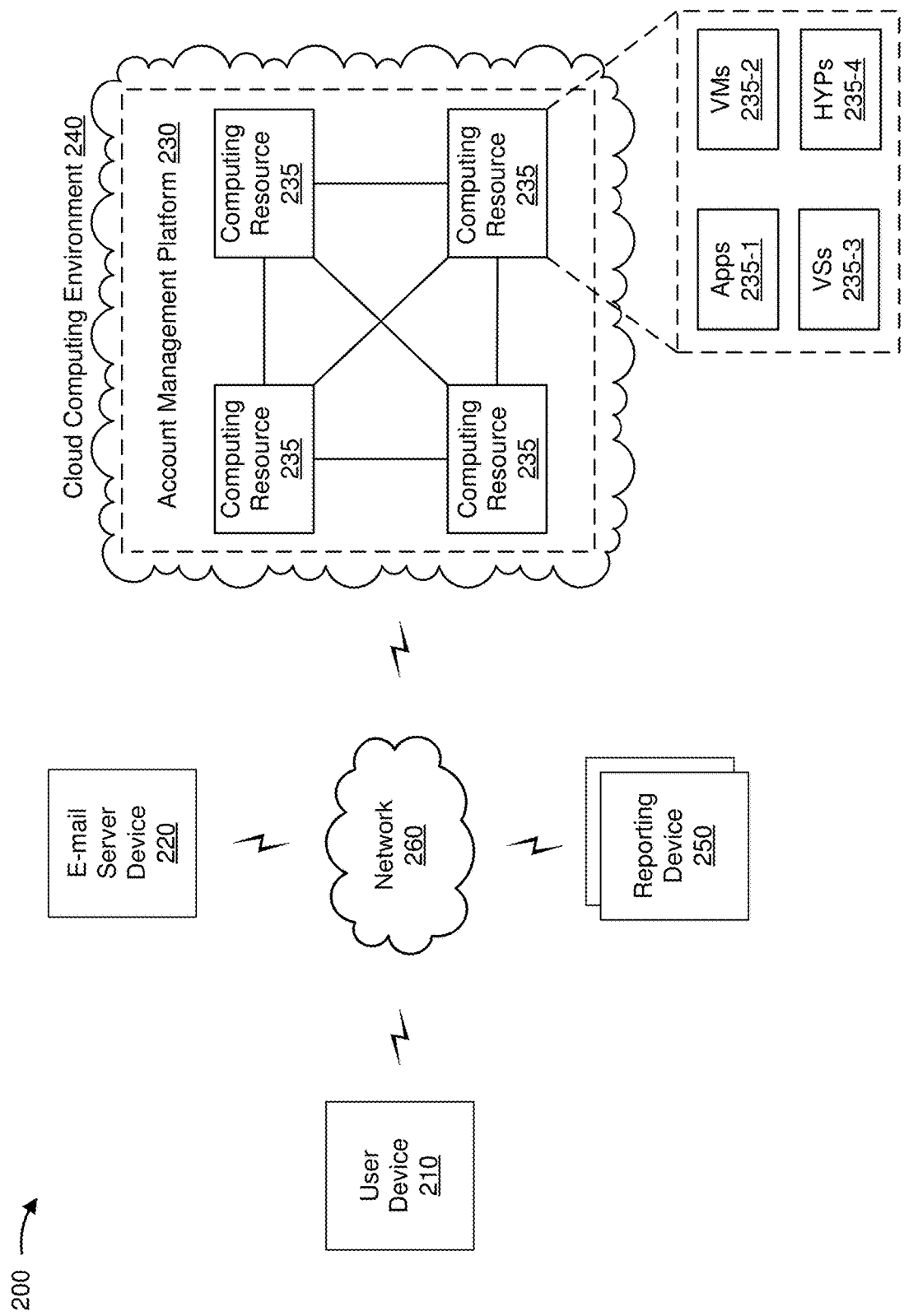
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an e-mail server device 220, an account management platform 230 hosted within a cloud computing environment 240, a reporting device 250, and/or a network 260. Devices of environment 200 may interconnect via wired connections, wireless connections, or a combination of wired and wireless connections.

User device 210 includes one or more devices capable of receiving, generating, storing, processing, and/or providing information associated with one or more account management services. For example, user device 210 may include a computer (e.g., a desktop computer, a laptop computer, a tablet computer, a handheld computer, a server device, etc.), a mobile phone (e.g., a smart phone, a radiotelephone, etc.), a wearable communication device (e.g., a smart wristwatch, a pair of smart eyeglasses, etc.), or a similar type of device. In some implementations, user device 210 may support and/or have access to an application that provides an individual with one or more account management services. In some implementations, user device 210 may interact with account management platform 230 to utilize the one or more account management services.

E-mail server device 220 includes one or more devices capable of receiving, storing, generating, and/or providing e-mail content associated with an e-mail account. For example, e-mail server device 220 may include a server device or a group of server devices. In some implementations, e-mail server device 220 may receive, as part of a secure access delegation service flow, an access request (e.g., that includes an access token) from account management platform 230. In some implementations, e-mail server device 220 may validate the access request and may provide e-mail content to account management platform 230.

Account management platform 230 includes one or more devices capable of receiving, storing, generating, determining, and/or providing information associated with one or more account management services. For example, account management platform 230 may include a server device (e.g., a host server, a web server, an application server, etc.), a data center device, or a similar device. In some implementations, account management platform 230 may support one or more account management services. The one or more account management services may be supported using a web application (e.g., accessible via a web interface of a website), a mobile application (e.g., accessible via a mobile application interface) a desktop application (e.g., accessible via a desktop application interface), and/or the like.

In some implementations, account management platform 230 may receive, from user device 210, an indication to provide an individual with one or more account management services. In some implementations, account management platform 230 may obtain e-mail content of the individual by interacting with one or more devices to utilize a secure access delegation service. For example, account management platform 230 may provide an authorization request to an authorization server, which may cause the authorization server to provide an access token to the account management platform. In this case, account management platform may provide the access token to e-mail server device 220 which, as described above, may cause e-mail server device 220 to validate the access request and to provide the e-mail content to account management platform 230. In some implementations, account management platform 230 may obtain e-mail contact associated with multiple e-mail accounts.

In some implementations, as shown, account management platform 230 may be hosted in cloud computing environment 240. Notably, while implementations described herein describe account management platform 230 as being hosted in cloud computing environment 240, in some implementations, account management platform 230 might not be cloud-based (i.e., may be implemented outside of a cloud computing environment) or may be partially cloud-based.

Cloud computing environment 240 includes an environment that hosts account management platform 230. Cloud computing environment 240 may provide computation, software, data access, storage, etc., services that do not require end-user knowledge of a physical location and configuration of system(s) and/or device(s) that hosts account management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host account management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or e-mail server device 220. Application 235-1 may eliminate a need to install and execute the software applications on these devices. For example, application 235-1 may include software associated with account management platform 230 and/or any other software capable of being provided via cloud computing environment 240. In some implementations, one application 235-1 may send/receive information to/from one or more other applications 235-1, via virtual machine 235-2. In some implementations, application 235-1 may be a mobile application or a web application that allows user device 210 to display a list of one or more applications with which an individual has an account, a recommendation to change login information to an application that has been compromised by a data breach, a message indicating that the login information to the application has been changed automatically, and/or the like.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210 and/or e-mail server device 220, etc.), and may manage infrastructure of cloud computing environment 240, such as data management, synchronization, and/or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Reporting device 250 includes one or more devices capable of receiving, storing, generating, determining, and/or providing information associated with a data breach. For example, reporting device 250 may include a server device or a group of server devices. In some implementations, reporting device 250 may provide reporting data identifying a data breach to account management platform 230. In some implementations, multiple reporting devices 250 may provide the reporting data to account management platform 230.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
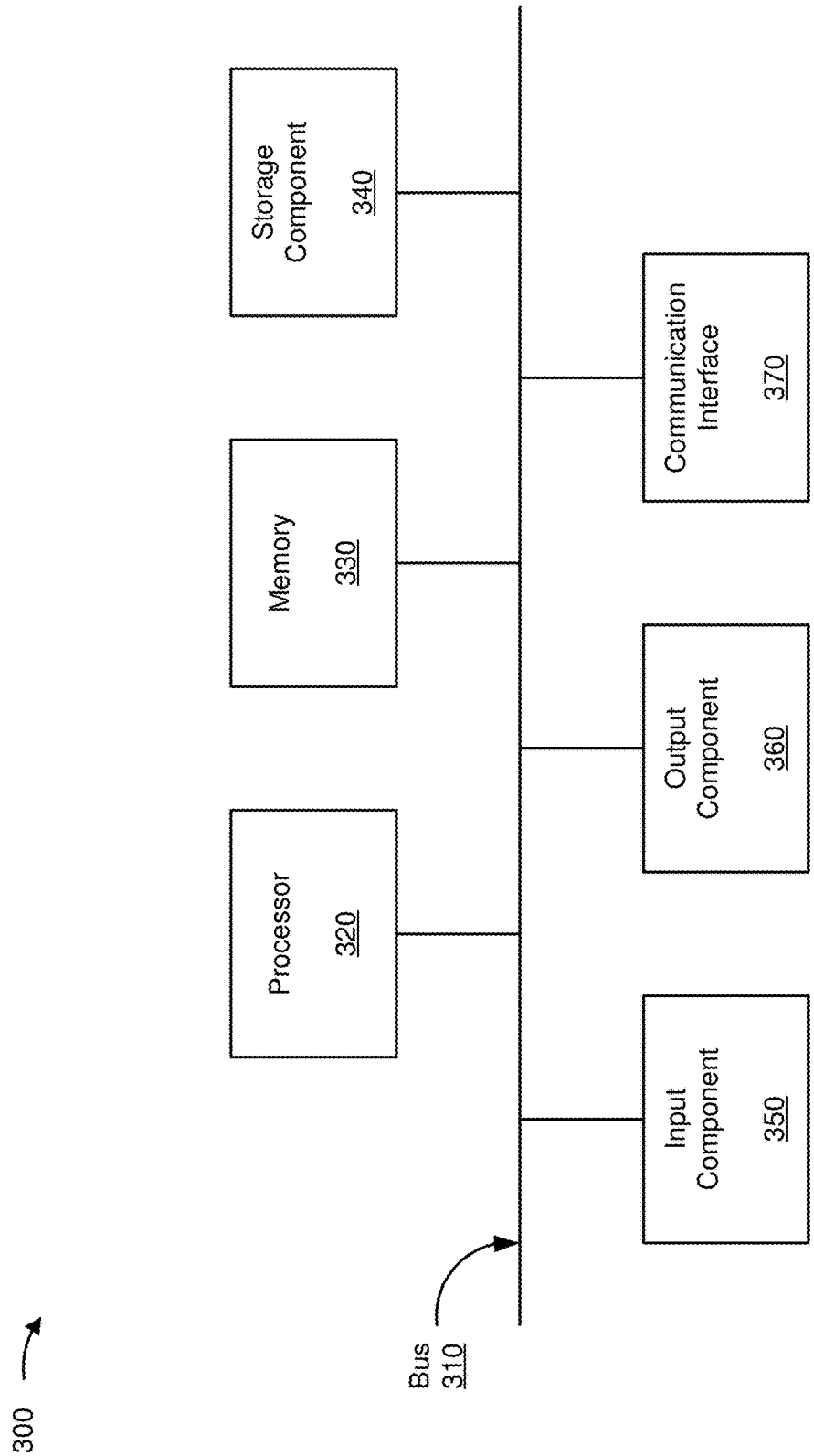
FIG. 3 is a diagram of example components of one or more devices of FIG. 2.

FIG. 3 is a diagram of example components of a device 300. Device 300 may correspond to user device 210, e-mail server device 220, account management platform 230, and/or reporting device 250. In some implementations, user device 210, e-mail server device 220, account management platform 230, and/or reporting device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
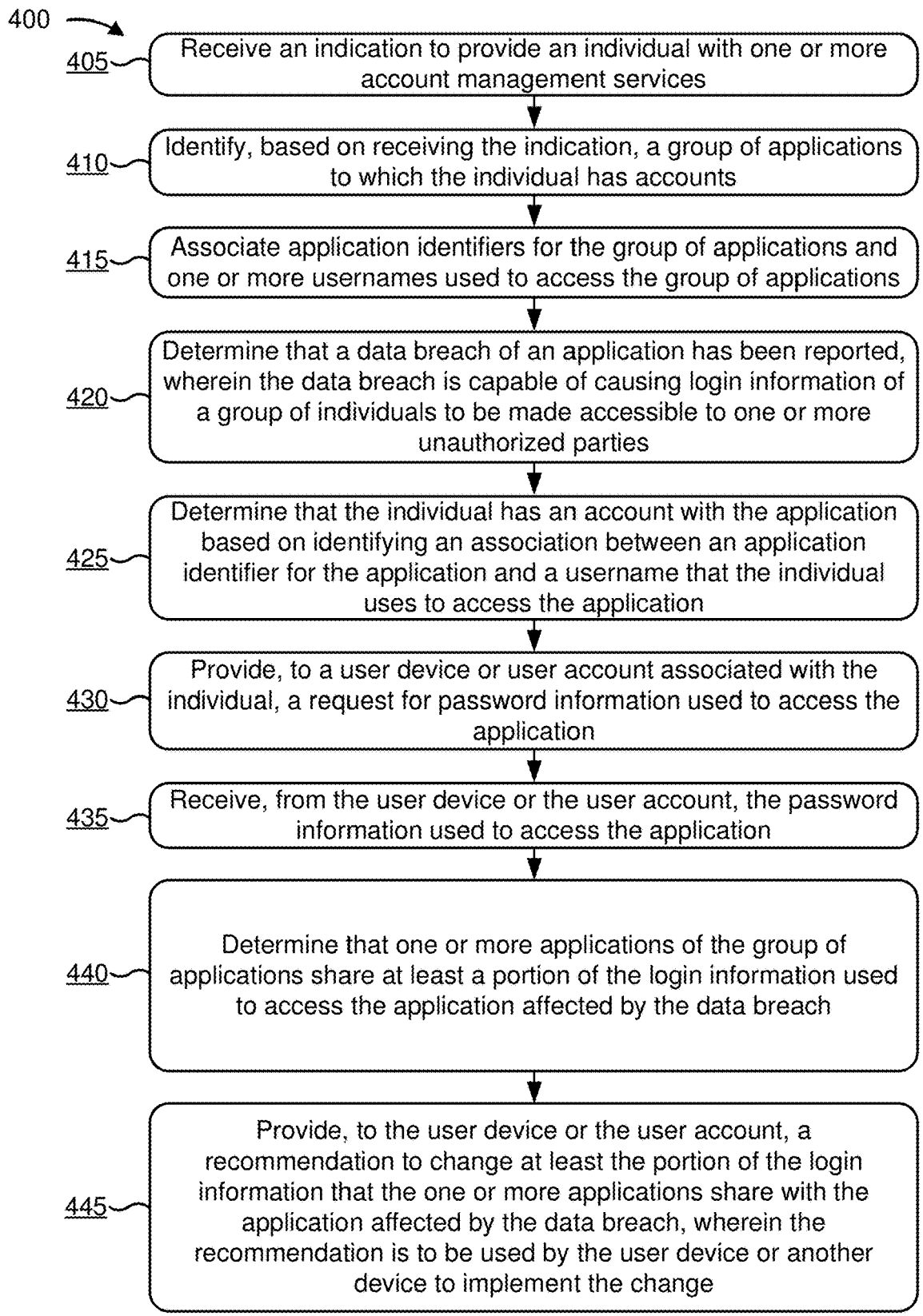
FIGS. 4-6 are examples of flow charts for managing login information affected by a data breach.

FIG. 4 is a flow chart of an example process 400 for managing login information affected by a data breach. In some implementations, one or more process blocks of FIG. 4 may be performed by an account management platform (e.g., account management platform 230). In some implementations, one or more process blocks of FIG. 4 may be performed by another device or a group of devices separate from or including the account management platform, such as a user device (e.g., user device 210), an e-mail server device (e.g., e-mail server device 220), a reporting device (e.g., reporting device 250), and/or the like.

As shown in FIG. 4, process 400 may include receiving an indication to provide an individual with one or more account management services (block 405). For example, the account management platform (e.g., using computing resource 235, processor 320, memory 330, storage component 340, input component 350, communication interface 370, and/or the like) may receive an indication to provide an individual with one or more account management services, as described above in connection with FIGS. 1A-1E.

As further shown in FIG. 4, process 400 may include identifying, based on receiving the indication, a group of applications with which the individual has accounts (block 410). For example, the account management platform (e.g., using computing resource 235, processor 320, memory 330, storage component 340, and/or the like) may identify, based on receiving the indication, a group of applications with which the individual has accounts, as described above in connection with FIGS. 1A-1E. In some implementations, the group of application is to refer to one or more applications with which the individual has accounts.

As further shown in FIG. 4, process 400 may include associating application identifiers for the group of applications and one or more usernames used to access the group of applications (block 415). For example, the account management platform (e.g., using computing resource 235, processor 320, memory 330, storage component 340, and/or the like) may associate application identifiers for the group of applications and one or more usernames used to access the group of applications, as described above in connection with FIGS. 1A-1E.

As further shown in FIG. 4, process 400 may include determining that a data breach of an application has been reported, wherein the data breach is capable of causing login information of a group of individuals to be made accessible to one or more unauthorized parties (block 420). For example, the account management platform (e.g., using computing resource 235, processor 320, memory 330, storage component 340, input component 350, communication interface 370, and/or the like) may determine that a data breach of an application has been reported, as described above in connection with FIGS. 1A-1E. In some implementations, the data breach may be capable of causing login information of a group of individuals to be made accessible to one or more unauthorized parties.

As further shown in FIG. 4, process 400 may include determining that the individual has an account with the application based on identifying an association between an application identifier for the application and a username that the individual uses to access the application (block 425). For example, the account management platform (e.g., using computing resource 235, processor 320, memory 330, storage component 340, and/or the like) may determine that the individual has an account with the application based on identifying an association between an application identifier for the application and a username that the individual uses to access the application, as described above in connection with FIGS. 1A-1E. Some implementations described herein refer to the individual having an account with an application. It is to be understood that this refers to the individual having an account used to access the application, having an account associated with the application, having login information used to access the application, and/or the like.

As further shown in FIG. 4, process 400 may include providing, to a user device or user account associated with the individual, a request for password information used to access the application (block 430). For example, the account management platform (e.g., using computing resource 235, processor 320, memory 330, storage component 340, output component 360, communication interface 370, and/or the like) may provide, to a user device (e.g., user device 210) or user account (e.g., an e-mail account, an account with an account management application, etc.) associated with the individual, a request for password information used to access the application, as described above in connection with FIGS. 1A-1E.

As further shown in FIG. 4, process 400 may include receiving, from the user device or the user account, the password information used to access the application (block 435). For example, the account management platform (e.g., using computing resource 235, processor 320, memory 330, storage component 340, input component 350, communication interface 370, and/or the like) may receive, from the user device or the user account, the password information used to access the application, as described above in connection with FIGS. 1A-1E.

As further shown in FIG. 4, process 400 may include determining that one or more applications of the group of applications share at least a portion of the login information used to access the application affected by the data breach (block 440). For example, the account management platform (e.g., using computing resource 235, processor 320, memory 330, storage component 340, input component 350, output component 360, communication interface 370, and/or the like) may determine that one or more applications of the group of applications share at least a portion of the login information used to access the application affected by the data breach, as described above in connection with FIGS. 1A-1E. Sharing at least a portion of the login information, as used herein, is to be understood to refer to login information for a first application (e.g., the application affected by the data breach) having one or more login information values (e.g., characters, numbers, symbols, and/or the like) in common with a second application (e.g., another application with which the individual has an account).

In some implementations, sharing at least a portion of the login information may refer to sharing a username and/or password information with the application. Additionally, or alternatively, sharing at least a portion of the login information may refer to sharing a threshold level of similarity with a username and/or password information of the application (e.g., such as by having a threshold number of similar characters as a username and/or a password used to log in to the application).

As further shown in FIG. 4, process 400 may include providing, to the user device or the user account, a recommendation to change at least the portion of the login information that the one or more applications share with the application affected by the data breach, wherein the recommendation is to be used by the user device or another device to implement the change (block 445). For example, the account management platform (e.g., using computing resource 235, processor 320, memory 330, storage component 340, input component 350, communication interface 370, and/or the like) may provide, to the user device or the user account, a recommendation to change at least the portion of the login information that the one or more applications share with the application affected by the data breach, as described above in connection with FIGS. 1A-1E. In some implementations, the recommendation may be used by the user device or another device to implement the change. Implementing the change, as used herein, may refer to changing at least the portion of the login information that the one or more applications share with the application affected by the data breach.

Process 400 may include additional implementations, such as any single implementation or any combination of implementations described below and/or in connection with one or more other processes described elsewhere herein.

In some implementations, the account management platform may obtain, after receiving the indication to provide the individual with the one or more account management services, electronic mail (e-mail) content associated with an e-mail account of the individual by using a secure access delegation service to search the e-mail account. Additionally, when identifying the group of applications, the account management platform may use a semantic engine parser to analyze the e-mail content to identify a set of keywords indicative of the individual having the accounts with the group of applications and may identify the group of applications based on the set of keywords.

In some implementations, the account management platform may verify whether the individual has the accounts with the group of applications based on results of initiating a password reset procedure for each application of the group of applications. In some implementations, the application may be a website. In some implementations, the account management platform may search one or more reporting websites to obtain reporting data describing the data breach. The reporting data may include at least one of: a uniform resource locator (URL) of the web site or data identifying a list of usernames affected by the data breach. Additionally, when determining that the data breach of the website has been reported, the account management platform may determine that the data breach of the website has been reported by analyzing the reporting data.

In some implementations, the account management platform may determine a set of properties associated with the password information used to access the application and may determine that a subset of the group of applications have password restrictions that require particular properties that are not found in the password information used to access the application. Additionally, determining that the one or more applications share at least the portion of the login information with the application, the account management platform may forgo performance of the login procedure on the subset of the group of applications and may perform the login procedure on a remainder of the group of applications.

In some implementations, when determining that the one or more applications share at least the portion of the login information with the application, the account management platform may perform the login procedure for the one or more applications by using one or more of the application identifiers to visit interfaces for the one or more applications. Additionally, the account management platform may input the login information to an interface of the one or more applications. Additionally, the account management platform may receive an indication that the login procedure was successful.

In some implementations, when receiving the password information, the account management platform may receive a group of variants of a password from the user device. Additionally, when determining that the one or more applications share at least the portion of the login information with the application, the account management platform may perform the login procedure to test whether the individual uses the group of variants of the password for particular applications of the group of applications, and may determine that the individual uses a variant of the password for a particular application of the particular applications. In some implementations, when providing the recommendation to the user device, the account management platform may provide another recommendation to change the variant of the password for the particular application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
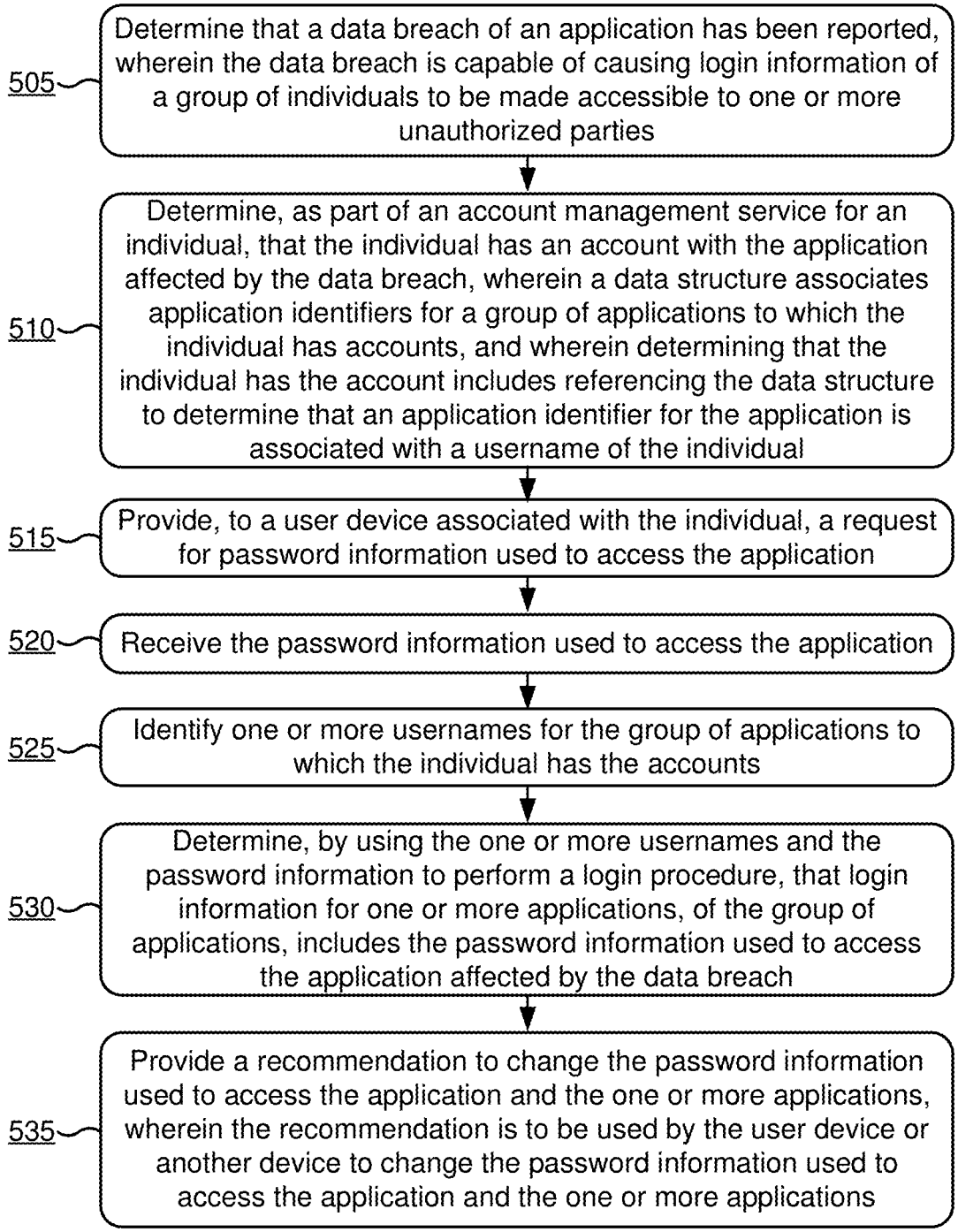

FIG. 5 is a flow chart of an example process 500 for managing login information affected by a data breach. In some implementations, one or more process blocks of FIG. 5 may be performed by an account management platform (e.g., account management platform 230). In some implementations, one or more process blocks of FIG. 5 may be performed by another device or a group of devices separate from or including the account management platform, such as a user device (e.g., user device 210), an e-mail server device (e.g., e-mail server device 220), a reporting device (e.g., reporting device 250), and/or the like.

As shown in FIG. 5, process 500 may include determining that a data breach of an application has been reported, wherein the data breach is capable of causing login information of a group of individuals to be made accessible to one or more unauthorized parties (block 505). For example, the account management platform (e.g., using computing resource 235, processor 320, memory 330, storage component 340, input component 350, communication interface 370, and/or the like) may determine that a data breach of an application has been reported, as described above in connection with FIGS. 1A-1E. In some implementations, the data breach may be capable of causing login information of a group of individuals to be made accessible to one or more unauthorized parties.

As further shown in FIG. 5, process 500 may include determining, as part of an account management service for an individual, that the individual has an account with the application affected by the data breach, wherein a data structure associates application identifiers for a group of applications with which the individual has accounts, and wherein determining that the individual has the account includes referencing the data structure to determine that an application identifier for the application is associated with a username of the individual (block 510). For example, the account management platform (e.g., using computing resource 235, processor 320, memory 330, storage component 340, and/or the like) may determine, as part of an account management service for an individual, that the individual has an account with the application affected by the data breach, as described above in connection with FIGS. 1A-1E. In some implementations, a data structure may associate application identifiers for a group of applications with which the individual has accounts. In some implementations, when determining that the individual has the account, the account management platform may reference the data structure to determine that an application identifier for the application is associated with a username of the individual.

As further shown in FIG. 5, process 500 may include providing, to a user device associated with the individual, a request for password information used to access the application (block 515). For example, the account management platform (e.g., using computing resource 235, processor 320, memory 330, storage component 340, output component 360, communication interface 370, and/or the like) may provide, to a user device associated with the individual, a request for password information used to access the application, as described above in connection with FIGS. 1A-1E.

As further shown in FIG. 5, process 500 may include receiving, from the user device, the password information used to access the application (block 520). For example, the account management platform (e.g., using computing resource 235, processor 320, memory 330, storage component 340, input component 350, communication interface 370, and/or the like) may receive, from the user device, the password information used to access the application, as described above in connection with FIGS. 1A-1E.

As further shown in FIG. 5, process 500 may include identifying, by referencing the data structure, one or more usernames for the group of applications with which the individual has the accounts (block 525). For example, the account management platform (e.g., using computing resource 235, processor 320, memory 330, storage component 340, and/or the like) may identify, by referencing the data structure, one or more usernames for the group of applications with which the individual has the accounts, as described above in connection with FIGS. 1A-1E.

As further shown in FIG. 5, process 500 may include determining, by using the one or more usernames and the password information to perform a login procedure, that login information for one or more applications, of the group of applications, includes the password information used to access the application affected by the data breach (block 530). For example, the account management platform (e.g., using computing resource 235, processor 320, memory 330, storage component 340, input component 350, output component 360, communication interface 370, and/or the like) may determine, by using the one or more usernames and the password information to perform a login procedure, that login information for one or more applications, of the group of applications, includes the password information used to access the application affected by the data breach, as described above in connection with FIGS. 1A-1E.

As further shown in FIG. 5, process 500 may include providing, to the user device, a recommendation to change the password information used to access the application and the one or more applications, wherein the recommendation is to be used by the user device or another device to change the password information used to access the application and the one or more applications (block 535). For example, the account management platform (e.g., using computing resource 235, processor 320, memory 330, storage component 340, output component 360, communication interface 370, and/or the like) may provide, to the user device, a recommendation to change the password information used to access the application and the one or more applications, as described above in connection with FIGS. 1A-1E. In some implementations, the recommendation may be used by the user device or another device to change the password information used to access the application and the one or more applications.

Process 500 may include additional implementations, such as any single implementation or any combination of implementations described below and/or in connection with one or more other processes described elsewhere herein.

In some implementations, the account management platform may obtain, as part of the account management service and prior to determining that the data breach has been reported, electronic mail (e-mail) content associated with an e-mail account of the individual. The e-mail content may be obtained by using a secure access delegation service to search the e-mail account. Additionally, the account management platform may use a semantic engine parser to analyze the e-mail content to identify a set of keywords indicative of the individual having the accounts with the group of applications. The set of keywords may include the one or more usernames for the group of applications. In some implementations, the account management platform may update the data structure to associate the application identifiers for the group of applications and the one or more usernames of the individual.

In some implementations, the account management platform may perform, prior to updating the data structure, a password reset procedure to verify whether the one or more usernames are valid. The password reset procedure may be capable of causing an e-mail to be provided to the e-mail account. The e-mail may be used to indicate that a particular username is valid. In some implementations, the account management platform may search one or more third party reporting applications to obtain reporting data describing the data breach. The reporting data may include the application identifier for the application. In some implementations, when determining that the data breach of the application has been reported, the account management platform may determine that the data breach of the application has been reported by analyzing the reporting data.

In some implementations, the password information may be stored by one or more memories, and the account management platform may determine a set of properties associated with the password information used to access the application. In some implementations, the account management platform may provide the set of properties and the application identifiers for the group of applications as input to a data model to cause the data model to identify a subset of the group of applications that do not need to be tested using the login procedure. The subset of the group of applications have password restrictions that require particular properties that are not found in the set of properties associated with the password information used to access the application. In some implementations, when determining that the login information for the one or more applications includes the password information used to access the application, the account management platform may forgo performance of the login procedure on the subset of the group of applications, perform the login procedure on a remainder of the group of applications, and delete the password information from the one or more memories.

In some implementations, when determining that the login information for the one or more applications includes the password information used to access the application, the account management platform may perform the login procedure for the one or more applications, and, when performing the login procedure, the account management platform may use one or more of the application identifiers to visit interfaces for the one or more applications, input the login information to an interface of the one or more applications, and receive an indication of whether the login procedure was successful.

In some implementations, when receiving the password information, the account management platform may receive a group of variants of a password from the user device. Additionally, the account management platform may identify a number of failed login attempts that are permitted when logging into the group of applications, and, when determining that the login information for the one or more applications includes the password information used to access the application, the account management platform may perform the login procedure to test whether the individual uses the group of variants of the password for particular applications of the group of applications. A number of times that the login procedure is to be performed is not to exceed the number of failed login attempts that are permitted. In some implementations, the account management platform may determine that the individual uses a variant of the password for a particular application of the particular applications. In some implementations, when providing the recommendation to the user device, the account management platform may provide another recommendation to change the variant of the password for the particular application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
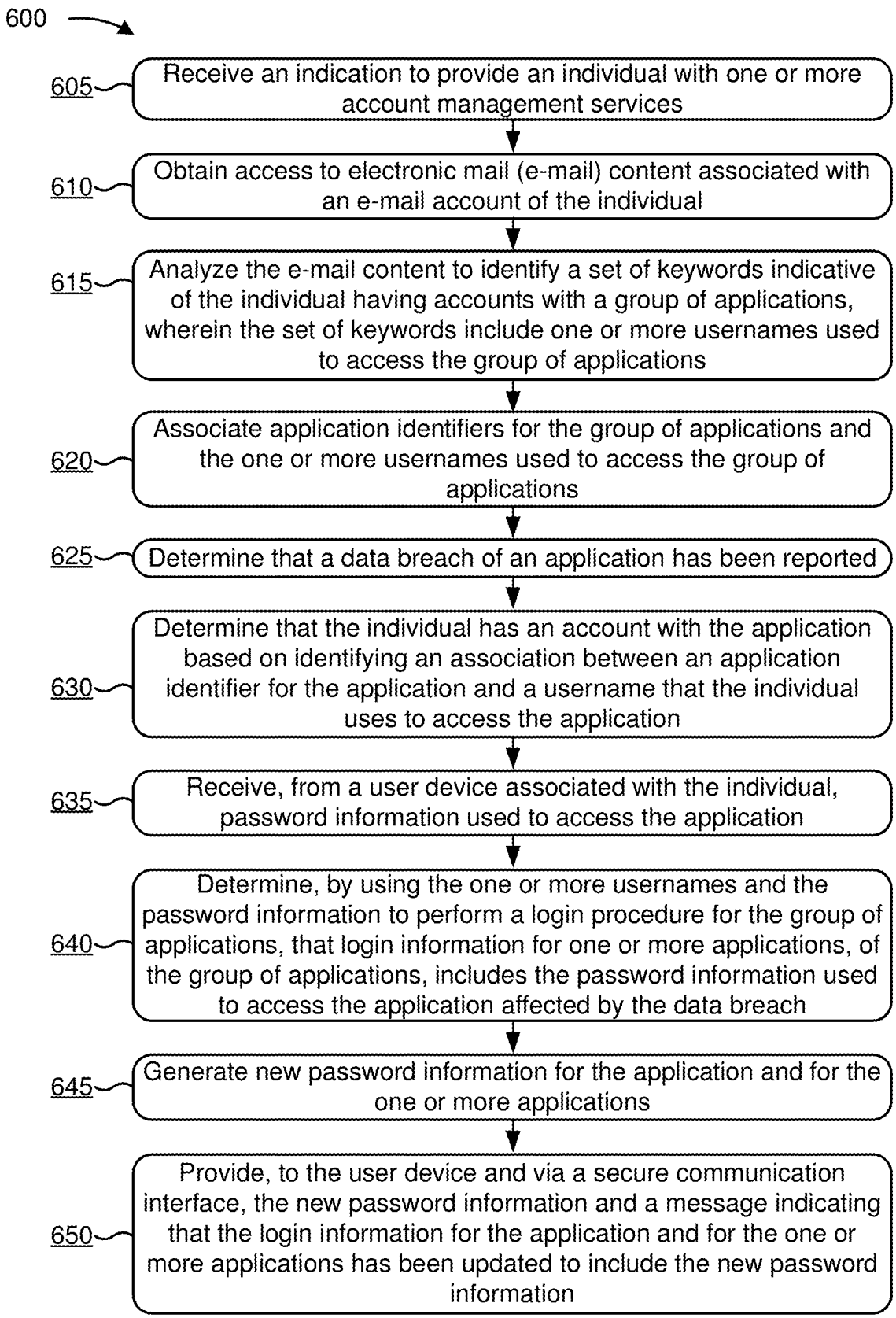

FIG. 6 is a flow chart of an example process 600 for managing login information affected by a data breach. In some implementations, one or more process blocks of FIG. 6 may be performed by an account management platform (e.g., account management platform 230). In some implementations, one or more process blocks of FIG. 6 may be performed by another device or a group of devices separate from or including the account management platform, such as a user device (e.g., user device 210), an e-mail server device (e.g., e-mail server device 220), a reporting device (e.g., reporting device 250), and/or the like.

As shown in FIG. 6, process 600 may include receiving an indication to provide an individual with one or more account management services (block 605). For example, the account management platform (e.g., using computing resource 235, processor 320, memory 330, storage component 340, input component 350, communication interface 370, and/or the like) may receive an indication to provide an individual with one or more account management services, as described above in connection with FIGS. 1A-1E.

As further shown in FIG. 6, process 600 may include obtaining access to electronic mail (e-mail) content associated with an e-mail account of the individual (block 610). For example, the account management platform (e.g., using computing resource 235, processor 320, memory 330, storage component 340, input component 350, output component 360, communication interface 370, and/or the like) may obtain access to electronic mail (e-mail) content associated with an e-mail account of the individual, as described above in connection with FIGS. 1A-1E.

As further shown in FIG. 6, process 600 may include analyzing the e-mail content to identify a set of keywords indicative of the individual having accounts with a group of applications, wherein the set of keywords include one or more usernames used to access the group of applications (block 615). For example, the account management platform (e.g., using computing resource 235, processor 320, memory 330, storage component 340, input component 350, communication interface 370, and/or the like) may analyze the e-mail content to identify a set of keywords indicative of the individual having accounts with a group of applications, as described above in connection with FIGS. 1A-1E. In some implementations, the set of keywords may include one or more usernames used to access the group of applications.

As further shown in FIG. 6, process 600 may include associating application identifiers for the group of applications and the one or more usernames used to access the group of applications (block 620). For example, the account management platform (e.g., using computing resource 235, processor 320, memory 330, storage component 340, and/or the like) may associate application identifiers for the group of applications and the one or more usernames used to access the group of applications, as described above in connection with FIGS. 1A-1E.

As further shown in FIG. 6, process 600 may include determining that a data breach of an application has been reported (block 625). For example, the account management platform (e.g., using computing resource 235, processor 320, memory 330, storage component 340, input component 350, communication interface 370, and/or the like) may determine that a data breach of an application has been reported, as described above in connection with FIGS. 1A-1E.

As further shown in FIG. 6, process 600 may include determining that the individual has an account with the application based on identifying an association between an application identifier for the application and a username that the individual uses to access the application (block 630). For example, the account management platform (e.g., using computing resource 235, processor 320, memory 330, storage component 340, and/or the like) may determine that the individual has an account with the application based on identifying an association between an application identifier for the application and a username that the individual uses to access the application, as described above in connection with FIGS. 1A-1E.

As further shown in FIG. 6, process 600 may include receiving, from a user device associated with the individual, password information used to access the application (block 635). For example, the account management platform (e.g., using computing resource 235, processor 320, memory 330, storage component 340, input component 350, communication interface 370, and/or the like) may receive, from a user device associated with the individual, password information used to access the application, as described above in connection with FIGS. 1A-1E.

As further shown in FIG. 6, process 600 may include determining, by using the one or more usernames and the password information to perform a login procedure for the group of applications, that login information for one or more applications, of the group of applications, includes the password information used to access the application affected by the data breach (block 640). For example, the account management platform (e.g., using computing resource 235, processor 320, memory 330, storage component 340, input component 350, output component 360, communication interface 370, and/or the like) may determine, by using the one or more usernames and the password information to perform a login procedure for the group of applications, that login information for one or more applications, of the group of applications, includes the password information used to access the application affected by the data breach, as described above in connection with FIGS. 1A-1E.

As further shown in FIG. 6, process 600 may include generating new password information for the application and for the one or more applications (block 645). For example, the account management platform (e.g., using computing resource 235, processor 320, memory 330, storage component 340, and/or the like) may generate new password information for the application and for the one or more applications, as described above in connection with FIGS. 1A-1E.

As further shown in FIG. 6, process 600 may include providing, to the user device and via a secure communication interface, the new password information and a message indicating that the login information for the application and for the one or more applications has been updated to include the new password information (block 650). For example, the account management platform (e.g., using computing resource 235, processor 320, memory 330, storage component 340, output component 360, communication interface 370, and/or the like) may provide, to the user device and via a secure communication interface, the new password information and a message indicating that the login information for the application and for the one or more applications has been updated to include the new password information, as described above in connection with FIGS. 1A-1E.

Process 600 may include additional implementations, such as any single implementation or any combination of implementations described below and/or in connection with one or more other processes described elsewhere herein.

In some implementations, when generating the new password information, the account management platform may identify password restrictions that determine what characters are permitted to be included in passwords used for at least one of the application or the one or more applications. In some implementations, the account management platform may generate the new password information in a manner that is compliant with the password restrictions. In some implementations, the account management platform may perform, after identifying the set of keywords that include the one or more usernames, a password reset procedure to verify whether the one or more usernames are valid. The password reset procedure may be capable of causing an e-mail to be provided to the e-mail account. The e-mail may be used to indicate that a particular username is valid.

In some implementations, the account management platform may determine a set of properties associated with the password information used to access the application and may determine that a subset of the group of applications have password restrictions that require particular properties that are not found in the password information used to access the application. Additionally, when determining that the login information for the one or more applications includes the password information used to access the application, the account management platform may forgo performance of the login procedure on the subset of the group of applications, may perform the login procedure on a remainder of the group of applications, and may delete the password information from memory.

In some implementations, when determining that the login information for the one or more applications includes the password information used to access the application, the account management platform may use one or more of the application identifiers to visit interfaces for the one or more applications, may input the login information to an interface of the one or more applications, and may receive an indication that the login procedure was successful.

In some implementations, the password information may include a password, and, when receiving the password information, the account management platform may receive, from the user device, an indication that variants of the password have been used in the login information for particular applications of the group of applications. Additionally, when determining that the login information for the one or more applications includes the password information used to access the application, the account management platform may perform the login procedure to test whether the individual uses one or more variants of the password for the particular applications and may determine that the individual uses a variant of the password for a particular application. In some implementations, when generating the new password information, the account management platform may generate the new password information for the particular application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
 receiving, by a device, an indication to provide an individual with one or more account management services;
 obtaining, by the device and after receiving the indication to provide the individual with the one or more account management services, electronic mail (e-mail) content associated with an e-mail account of the individual by using a secure access delegation service to search the e-mail account;
 identifying, by the device and based on receiving the indication, a group of applications with which the individual has accounts,
  wherein identifying the group of applications comprises:
   using a semantic engine parser to analyze the e-mail content to identify a set of keywords indicative of the individual having the accounts with the group of applications, and
   identifying the group of applications based on the set of keywords;
 associating, by the device, website identifiers for the group of applications and one or more usernames used to access the group of applications;

determining, by the device, that a data breach of an application has been reported,
  wherein the data breach is capable of causing login information of a group of individuals to be made accessible to one or more unauthorized parties;
determining, by the device, that the individual has an account with the application based on identifying an association between an application identifier for the application and a username that the individual uses to access the application;
providing, by the device and to a user device or user account associated with the individual, a request for password information used to access the application;
receiving, by the device and from the user device or the user account, the password information used to access the application;
determining, by the device, that one or more applications of the group of applications share at least a portion of the login information used to access the application affected by the data breach; and
providing, by the device and to the user device or the user account, a recommendation to change at least the portion of the login information that the one or more applications share with the application affected by the data breach,
  wherein the recommendation is to be used by the user device or another device to implement the change.

2. The method of claim 1, further comprising:
verifying whether the individual has the accounts with the group of applications based on results of initiating a password reset procedure for each application of the group of applications.

3. The method of claim 1, wherein the application is a website; the method further comprising:
searching one or more reporting websites to obtain reporting data describing the data breach,
  wherein the reporting data includes at least one of:
    a uniform resource locator (URL) of the website, or
    data identifying a list of usernames affected by the data breach; and
  wherein determining that the data breach of the website has been reported comprises:
    determining that the data breach of the website has been reported by analyzing the reporting data.

4. The method of claim 1, wherein determining that the one or more applications share at least the portion of the login information with the application comprises:
performing a login procedure for the one or more applications by:
  using one or more application identifiers to visit interfaces for the one or more applications,
  inputting the login information to the interfaces of the one or more applications, and
  receiving an indication that the login procedure was successful.

5. The method of claim 1, further comprising:
determining a set of properties associated with the password information used to access the application;
determining that a subset of the group of applications have password restrictions that require particular properties that are not found in the password information used to access the application; and
wherein determining that the one or more applications share at least the portion of the login information with the application comprises:
  forgoing performance of a login procedure on the subset of the group of applications, and
  performing the login procedure on a remainder of the group of applications.

6. The method of claim 1, wherein receiving the password information comprises:
receiving a group of variants of a password from the user device;
wherein determining that the one or more applications share at least the portion of the login information with the application comprises:
  performing a login procedure to test whether the individual uses the group of variants of the password for particular applications of the group of applications, and
  determining that the individual uses a variant of the password for a particular application of the particular applications; and
wherein providing the recommendation to the user device comprises:
  providing another recommendation to change the variant of the password for the particular application.

7. The method of claim 1, further comprising:
generating new password information for the application and for the one or more applications; and
wherein providing the recommendation comprises:
  providing data identifying the new password information.

8. A device, comprising:
one or more memories; and
one or more processors operatively coupled to the one or more memories, configured to:
  obtain, as part of an account management service, electronic mail (e-mail) content associated with an e-mail account of an individual,
    wherein the e-mail content is obtained by using a secure access delegation service to search the e-mail account;
  use a semantic engine parser to analyze the e-mail content to identify a set of keywords indicative of the individual having accounts with a group of applications,
    wherein the set of keywords include one or more usernames for the group of applications;
  update a data structure to associate application identifiers for the group of applications and the one or more usernames;
  determine that a data breach of an application has been reported,
    wherein the data breach is capable of causing login information of a group of individuals to be made accessible to one or more unauthorized parties;
  determine, as part of the account management service for the individual, that the individual has an account with the application affected by the data breach,
    wherein determining that the individual has the account includes referencing the data structure to determine that an application identifier for the application is associated with a username of the individual;
  provide, to a user device associated with the individual, a request for password information used to access the application;
  receive, from the user device, the password information used to access the application;
  identify, by referencing the data structure, the one or more usernames;
  determine, by using the one or more usernames and the password information to perform a login procedure, that login information for one or more applications, of the group of applications, includes the password information used to access the application affected by the data breach; and provide, to the user device, a recommendation to change the password information used to access the application and the one or more applications, wherein the recommendation is to be used by the user device or another device to change the password information used to access the application and the one or more applications.

9. The device of claim 8, wherein the one or more processors are further configured to:

perform, prior to updating the data structure, a password reset procedure to verify whether the one or more usernames are valid, wherein the password reset procedure is capable of causing an e-mail to be provided to the e-mail account, and wherein the e-mail is used to indicate that a particular username is valid.

10. The device of claim 8, wherein the one or more processors are further configured to:

search one or more third party reporting applications to obtain reporting data describing the data breach, wherein the reporting data includes the application identifier for the application; and wherein the one or more processors, when determining that the data breach of the application has been reported, are to:

determine that the data breach of the application has been reported by analyzing the reporting data.

11. The device of claim 8, wherein the password information is stored by the one or more memories; wherein the one or more processors are further configured to:

determine a set of properties associated with the password information used to access the application;

provide the set of properties and the application identifiers for the group of applications as input to a data model to cause the data model to identify a subset of the group of applications that do not need to be tested using the login procedure, wherein the subset of the group of applications have password restrictions that require particular properties that are not found in the set of properties associated with the password information used to access the application; and wherein the one or more processors, when determining that the login information for the one or more applications includes the password information used to access the application, are configured to:

forgo performance of the login procedure on the subset of the group of applications, perform the login procedure on a remainder of the group of applications, and delete the password information from the one or more memories.

12. The device of claim 8, wherein the one or more processors, when determining that the login information for the one or more applications includes the password information used to access the application, are configured to:

perform the login procedure for the one or more applications, wherein the one or more processors, when performing the login procedure, are to:

use one or more of the application identifiers to visit interfaces for the one or more applications, input the login information to an interface of the one or more applications, and receive an indication of whether the login procedure was successful.

13. The device of claim 8, wherein the one or more processors, when receiving the password information, are configured to:

receive a group of variants of a password from the user device;

wherein the one or more processors are further to:

identify a number of failed login attempts that are permitted when logging into the group of applications;

wherein the one or more processors, when determining that the login information for the one or more applications includes the password information used to access the application, are configured to:

perform the login procedure to test whether the individual uses the group of variants of the password for particular applications of the group of applications, wherein a number of times that the login procedure is to be performed is not to exceed the number of failed login attempts that are permitted; and determine that the individual uses a variant of the password for a particular application of the particular applications; and wherein the one or more processors, when providing the recommendation to the user device, are configured to:

provide another recommendation to change the variant of the password for the particular application.

14. The device of claim 8, wherein the one or more processors are further configured to:

determine a set of properties associated with the password information used to access the application;

determine that a subset of the group of applications have password restrictions that require particular properties that are not found in the password information used to access the application; and wherein the one or more processors, when determining that the login information for the one or more applications includes the password information used to access the application, are configured to:

forego performance of the login procedure on the subset of the group of applications, and perform the login procedure on a remainder of the group of applications.

15. A non-transitory computer-readable medium storing one or more instructions, the one or more instructions comprising:

one or more instructions that, when executed by one or more processors of a device, cause the one or more processors to:

receive an indication to provide an individual with one or more account management services;

obtain access to electronic mail (e-mail) content associated with an e-mail account of the individual, wherein the e-mail content is obtained by using a secure access delegation service to search the e-mail account;

analyze, using a semantic engine parser, the e-mail content to identify a set of keywords indicative of the individual having accounts with a group of applications, wherein the set of keywords include one or more usernames used to access the group of applications;

associate application identifiers for the group of applications and the one or more usernames used to access the group of applications;

determine that a data breach of an application has been reported;

determine that the individual has an account with the application based on identifying an association between an application identifier for the application and a username that the individual uses to access the application;

receive, from a user device associated with the individual, password information used to access the application;

determine, by using the one or more usernames and the password information to perform a login procedure for the group of applications, that login information for one or more applications, of the group of applications, includes the password information used to access the application affected by the data breach;

generate new password information for the application and for the one or more applications; and provide, to the user device and via a secure communication interface, the new password information and a message indicating that the login information for the application and for the one or more applications has been updated to include the new password information.

16. The non-transitory computer-readable medium of claim 15, wherein the one or more instructions, that cause the one or more processors to generate the new password information, cause the one or more processors to:

identify password restrictions that determine what characters are permitted to be included in passwords used for at least one of:
  the application, or
  the one or more applications, and
generate the new password information in a manner that is compliant with the password restrictions.

17. The non-transitory computer-readable medium of claim 15, wherein the one or more instructions, when executed by the one or more processors, further cause the one or more processors to:

perform, after identifying the set of keywords that include the one or more usernames, a password reset procedure to verify whether the one or more usernames are valid,
  wherein the password reset procedure is capable of causing an e-mail to be provided to the e-mail account, and
  wherein the e-mail is to be used to indicate that a particular username is valid.

18. The non-transitory computer-readable medium of claim 15, wherein the one or more instructions, when executed by the one or more processors, further cause the one or more processors to:

determine a set of properties associated with the password information used to access the application;

determine that a subset of the group of applications have password restrictions that require particular properties that are not found in the password information used to access the application; and wherein the one or more instructions, that cause the one or more processors to determine that the login information for the one or more applications includes the password information used to access the application, cause the one or more processors to:

forgo performance of the login procedure on the subset of the group of applications,
perform the login procedure on a remainder of the group of applications, and
delete the password information from memory associated with the device.

19. The non-transitory computer-readable medium of claim 15, wherein the one or more instructions, that cause the one or more processors to determine that the login information for the one or more applications includes the password information used to access the application, cause the one or more processors to:

use one or more of the application identifiers to visit interfaces for the one or more applications,
input the login information to an interface of the one or more applications, and
receive an indication that the login procedure was successful.

20. The non-transitory computer-readable medium of claim 15, wherein the password information includes a password; and wherein the one or more instructions, that cause the one or more processors to receive the password information, cause the one or more processors to:

receive, from the user device, an indication that variants of the password have been used in the login information for particular applications of the group of applications;

wherein the one or more instructions, that cause the one or more processors to determine that the login information for the one or more applications includes the password information used to access the application, cause the one or more processors to:

perform the login procedure to test whether the individual uses one or more variants of the password for the particular applications, and
determine that the individual uses a variant of the password for a particular application; and wherein the one or more instructions, that cause the one or more processors to generate the new password information, cause the one or more processors to:

generate the new password information for the particular application.

* * * * *